(12) United States Patent
Kato

(10) Patent No.: US 10,592,189 B2
(45) Date of Patent: Mar. 17, 2020

(54) INFORMATION PROCESSING METHOD AND INFORMATION PROCESSING APPARATUS

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 64 days.

(21) Appl. No.: 15/501,113

(22) PCT Filed: Aug. 31, 2015

(86) PCT No.: PCT/JP2015/004416
§ 371 (c)(1),
(2) Date: Feb. 1, 2017

(87) PCT Pub. No.: WO2016/035320
PCT Pub. Date: Mar. 10, 2016

(65) Prior Publication Data
US 2017/0220309 A1    Aug. 3, 2017

(30) Foreign Application Priority Data

Sep. 4, 2014   (JP) .................................. 2014-180261

(51) Int. Cl.
*G06F 3/14* (2006.01)
*G09G 5/391* (2006.01)
(Continued)

(52) U.S. Cl.
CPC ............ *G06F 3/1423* (2013.01); *G06F 3/147* (2013.01); *G09G 3/2092* (2013.01); *G09G 5/391* (2013.01);
(Continued)

(58) Field of Classification Search
None
See application file for complete search history.

(56) References Cited

U.S. PATENT DOCUMENTS 5,926,166 A     7/1999  Khederzadeh et al.
6,460,109 B1 * 10/2002  Kaply .................. G06F 3/0227
                                                          710/305
(Continued)

FOREIGN PATENT DOCUMENTS

EP    2 778 897 A1    9/2014
EP    2 784 661 A1   10/2014
(Continued)

OTHER PUBLICATIONS

International Search Report dated Nov. 17, 2015 in PCT/JP2015/004416 filed on Aug. 31, 2015.
(Continued)

*Primary Examiner* — Christopher J Kohlman
(74) *Attorney, Agent, or Firm* — Oblon, McClelland, Maier & Neustadt, L.L.P.

(57) ABSTRACT

A non-transitory computer-readable recording medium stores an information processing program that causes a computer that constitutes an information processing apparatus including a built-in first display device, to execute a process. The process includes detecting, from outside the information processing apparatus, a state where a second display device is connected, the second display device being different from the first display device; setting both the first display device and the second display device as display destinations, when switching the display destination from the first display device to the second display device; switching the display destination to the second display device after setting both the first display device and the second display device as display destinations; and controlling a display image according to a screen specification of the second display device.

8 Claims, 16 Drawing Sheets

(51) Int. Cl.
*H04N 21/482* (2011.01)
*H04N 7/15* (2006.01)
*H04N 7/14* (2006.01)
*G06F 3/147* (2006.01)
*G09G 3/20* (2006.01)

(52) U.S. Cl.
CPC ............ *H04N 7/147* (2013.01); *H04N 7/152* (2013.01); *H04N 21/4825* (2013.01); *H04N 21/4828* (2013.01); *G06F 3/1454* (2013.01); *G09G 2340/0407* (2013.01); *G09G 2340/0442* (2013.01); *G09G 2370/04* (2013.01)

(56) References Cited

U.S. PATENT DOCUMENTS

| | | | |
|---|---|---|---|
| 9,210,374 | B2 | 12/2015 | Kato |
| 9,319,628 | B2 | 4/2016 | Kato |
| 2009/0160883 | A1* | 6/2009 | Sonobe .................... G09G 5/00 345/699 |
| 2013/0328878 | A1* | 12/2013 | Stahl ..................... G06F 3/1431 345/428 |
| 2014/0266978 | A1 | 9/2014 | Ishigami et al. |
| 2014/0292816 | A1 | 10/2014 | Shigemasa et al. |
| 2014/0327625 | A1 | 11/2014 | Thomas et al. |
| 2015/0002738 | A1* | 1/2015 | Shuto ............. H04N 21/440263 348/383 |

FOREIGN PATENT DOCUMENTS

| | | |
|---|---|---|
| JP | H06-130906 | 5/1994 |
| JP | H11-143598 | 5/1999 |
| JP | 2002-244632 | 8/2002 |
| JP | 2007-88933 A | 4/2007 |
| JP | 2009-200536 A | 9/2009 |
| JP | 2012-237964 | 12/2012 |
| JP | 2013-130823 | 7/2013 |
| JP | 2013-243433 | 12/2013 |
| JP | 2014-179708 | 9/2014 |
| WO | WO 2007/034886 A1 | 3/2007 |

OTHER PUBLICATIONS

Extended European Search Report dated Jul. 25, 2017 in European Patent Application No. 15837367.0.
Japanese Office Action dated Jul. 2, 2019, in Patent Application No. 2018-166956, 2 pages.

\* cited by examiner

[Fig. 1]
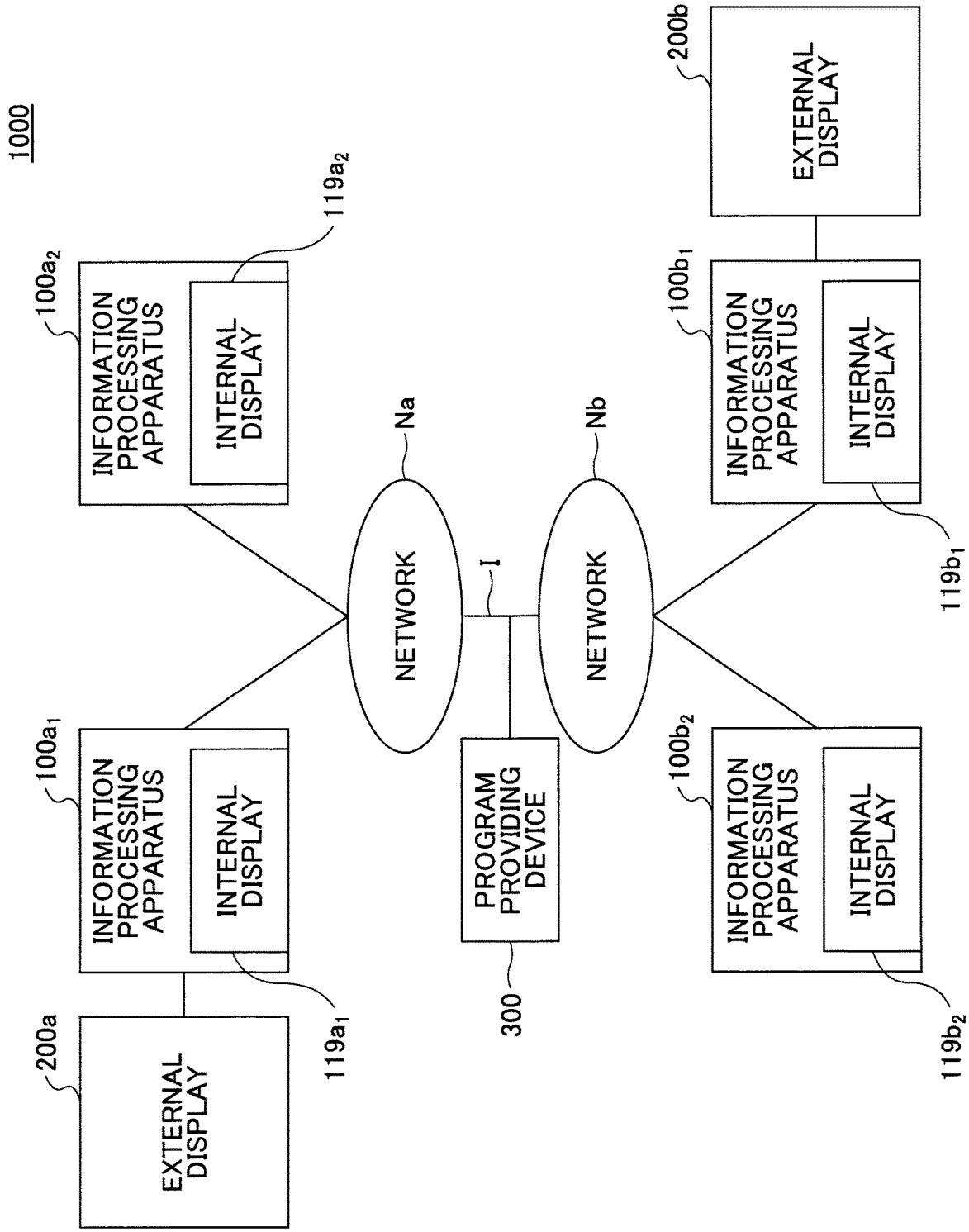

[Fig. 2]
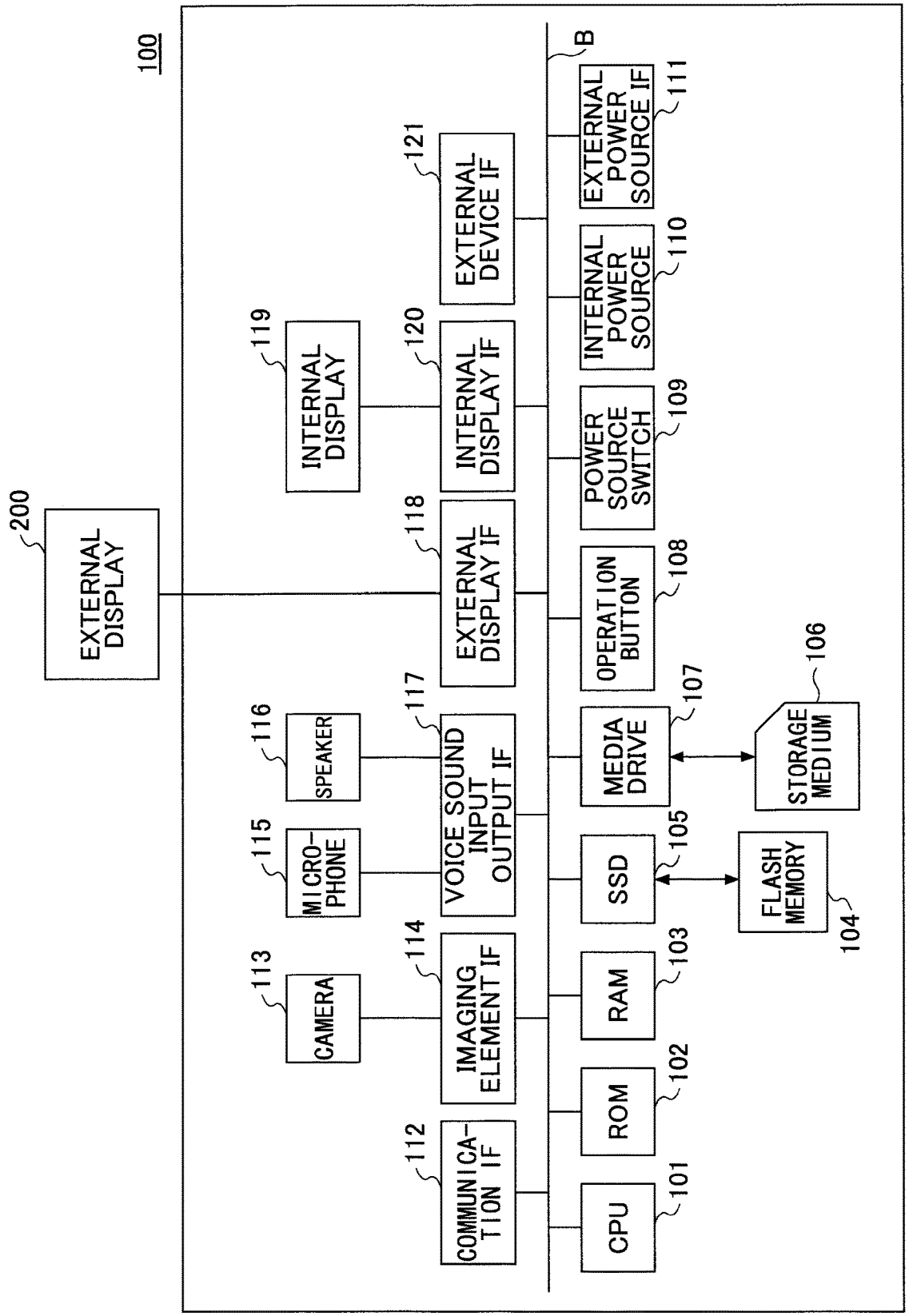

[Fig. 3A]
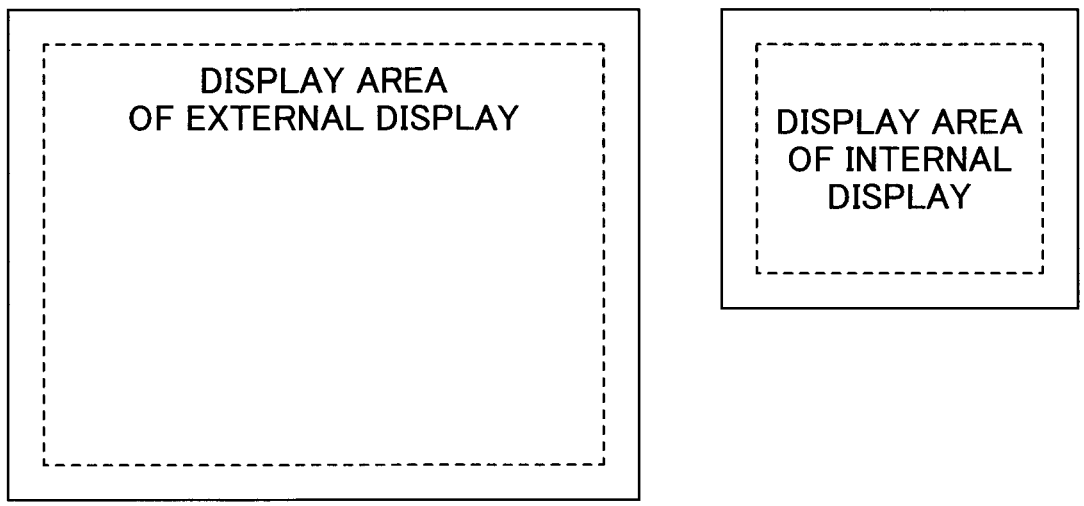
[Fig. 3B]
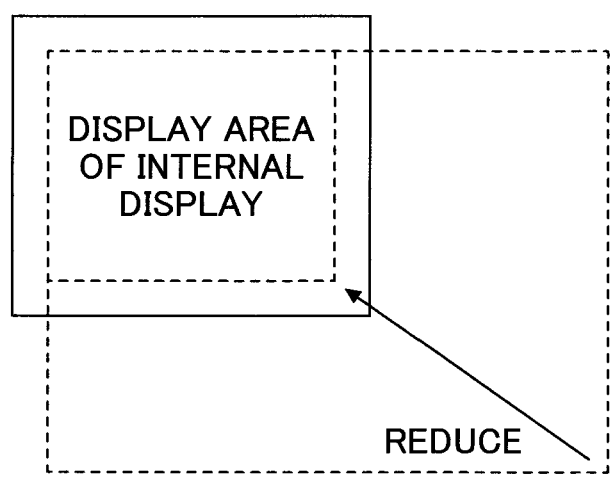

[Fig. 3C]
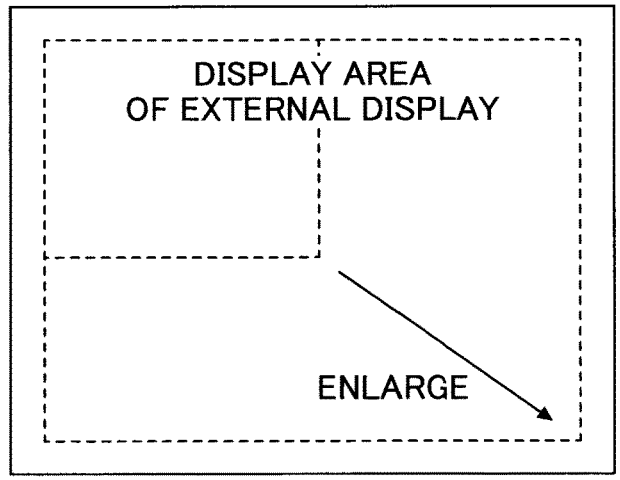
[Fig. 4]
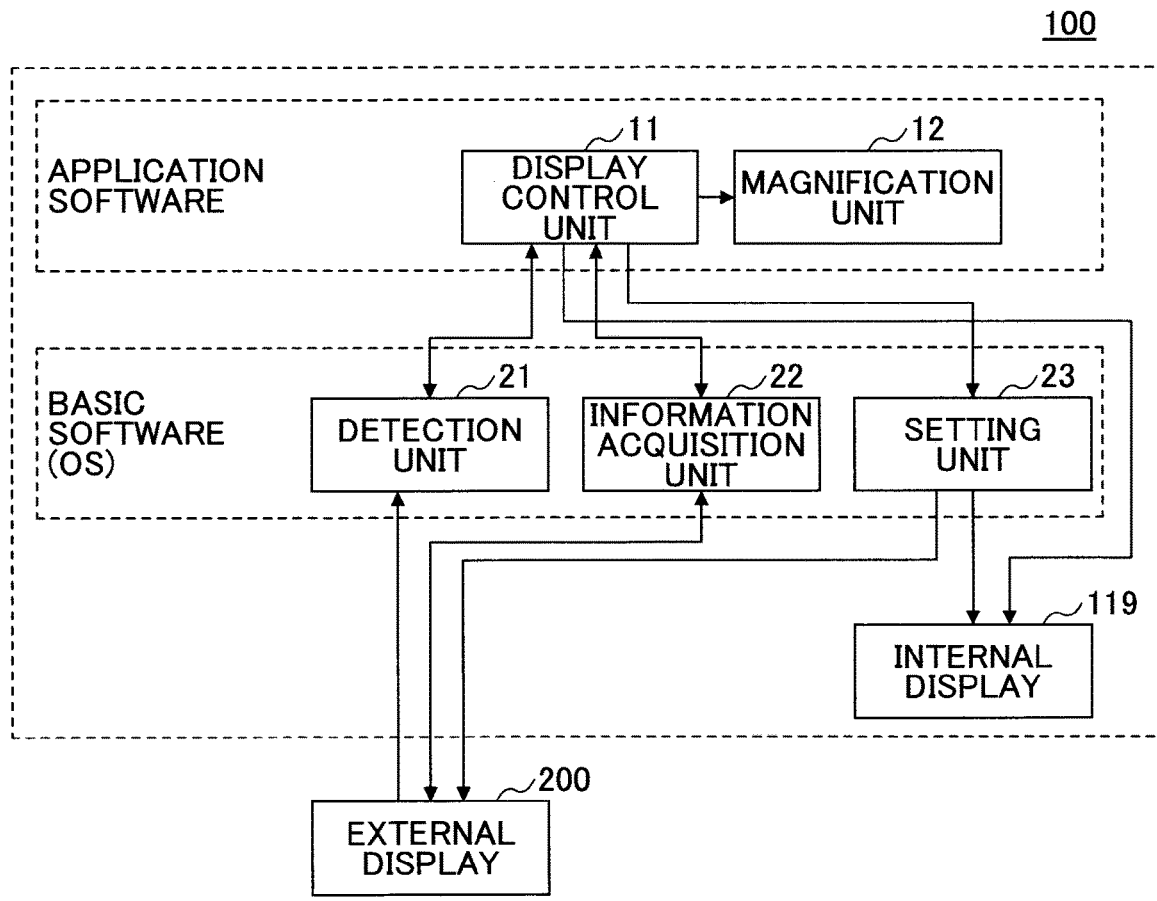

[Fig. 5]
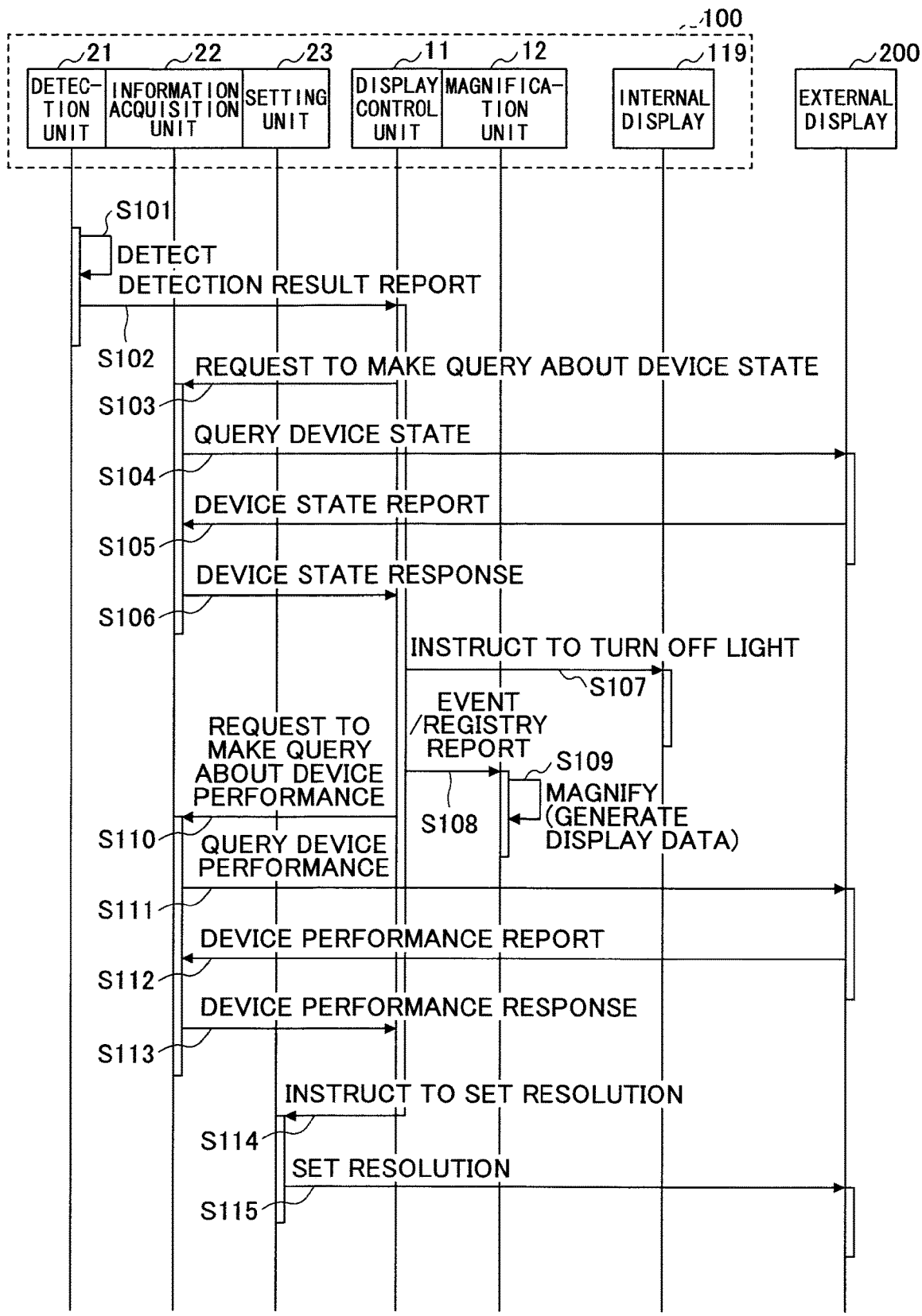

[Fig. 6]
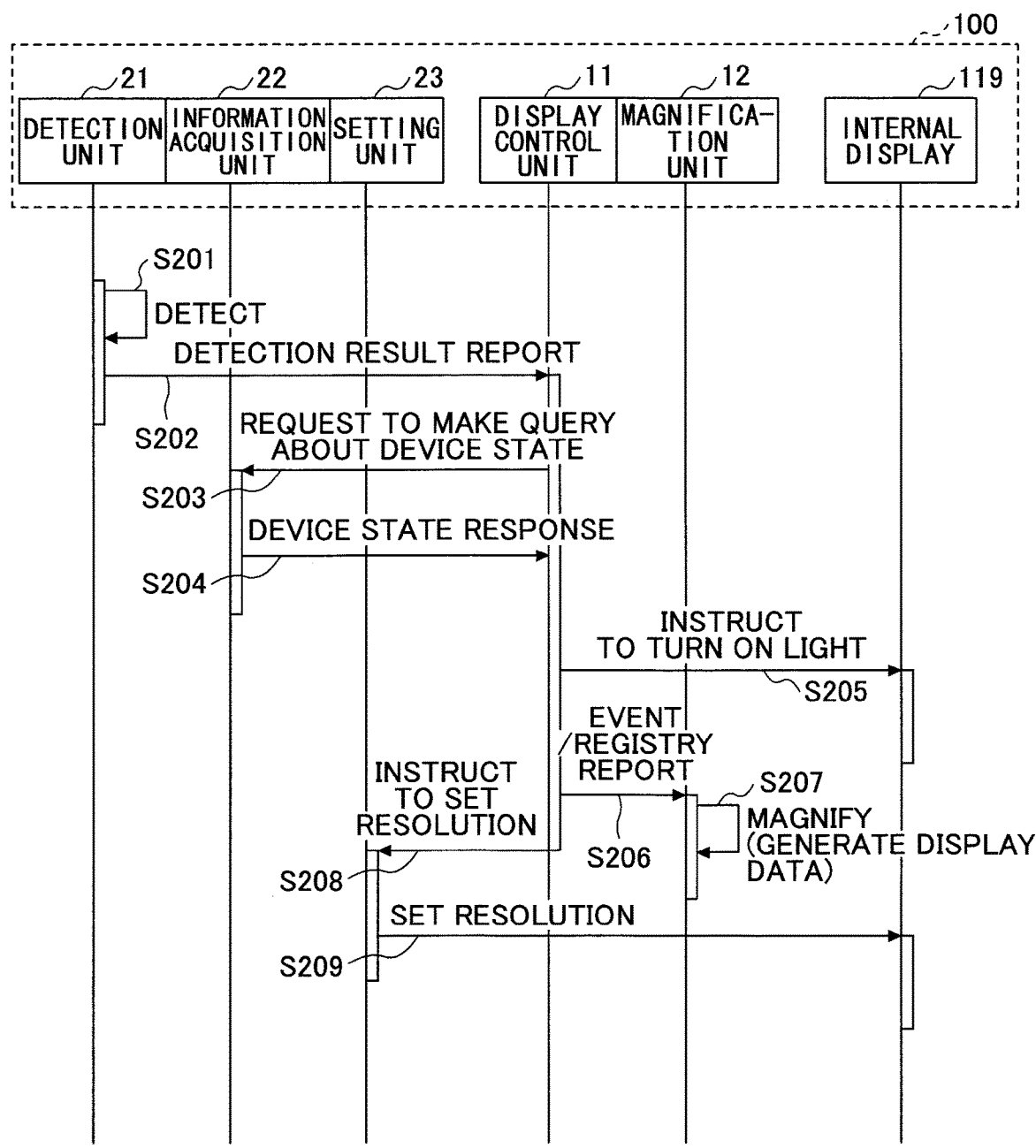

[Fig. 7]
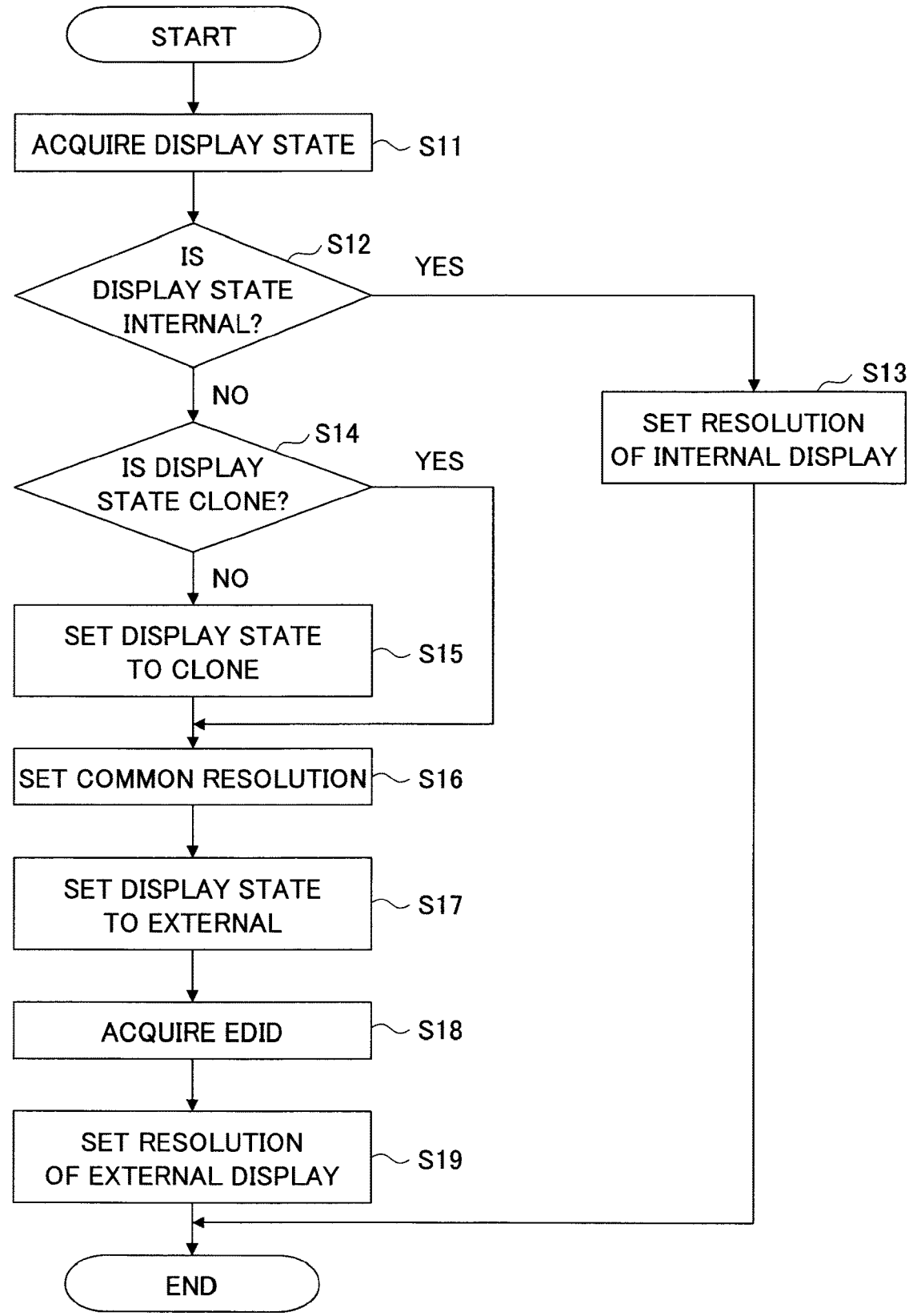

[Fig. 8A]
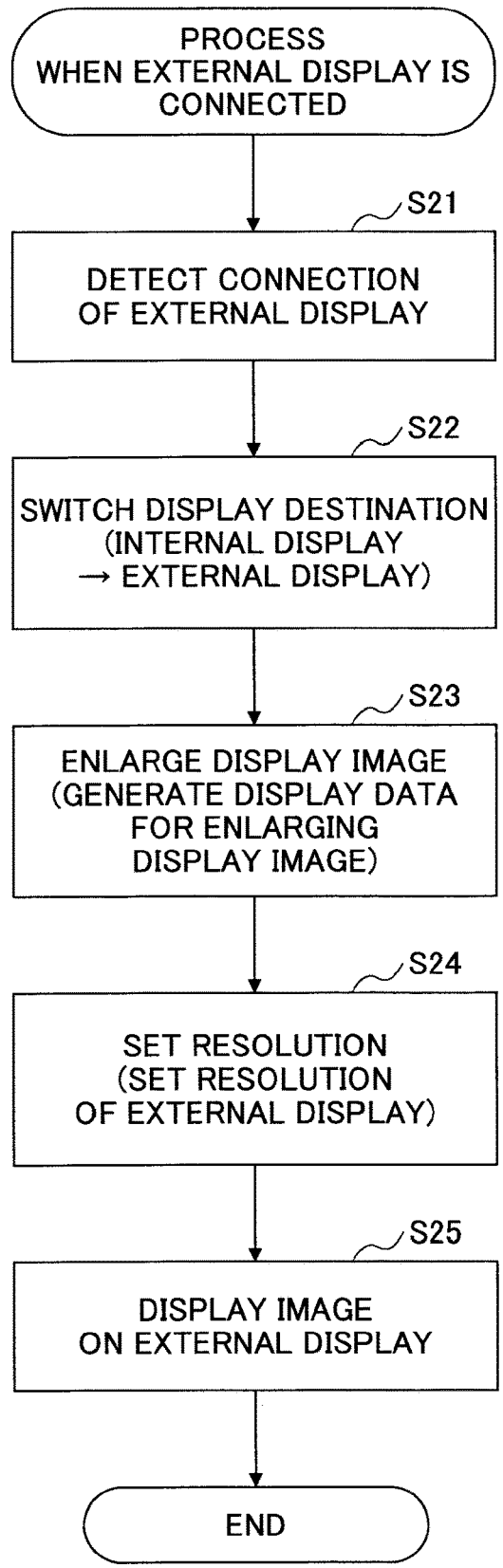

[Fig. 8B]
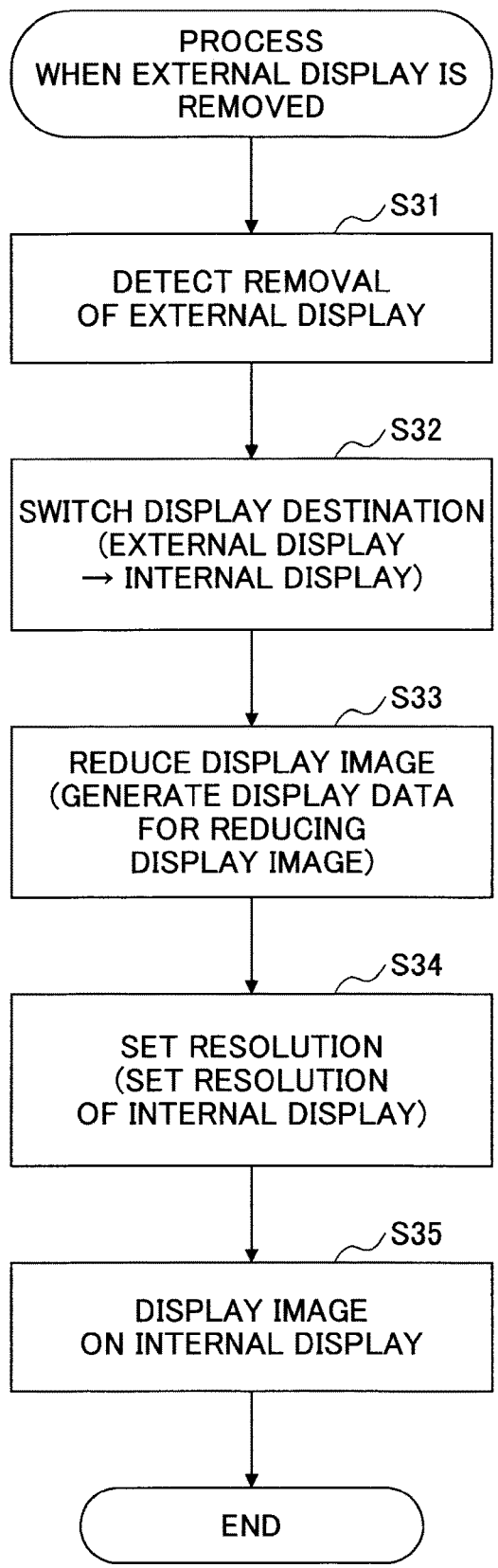

[Fig. 9]

| TYPE | PORT | RESOLUTION |
|---|---|---|
| AAA | VGA | aa × bb |
| AAA | HDMI | aa × cc |
| AAA | DVI | dd × cc |
| BBB | VGA | aa × cc |
| BBB | DVI | ee × bb |
| ⋮ | ⋮ | ⋮ |

[Fig. 10]
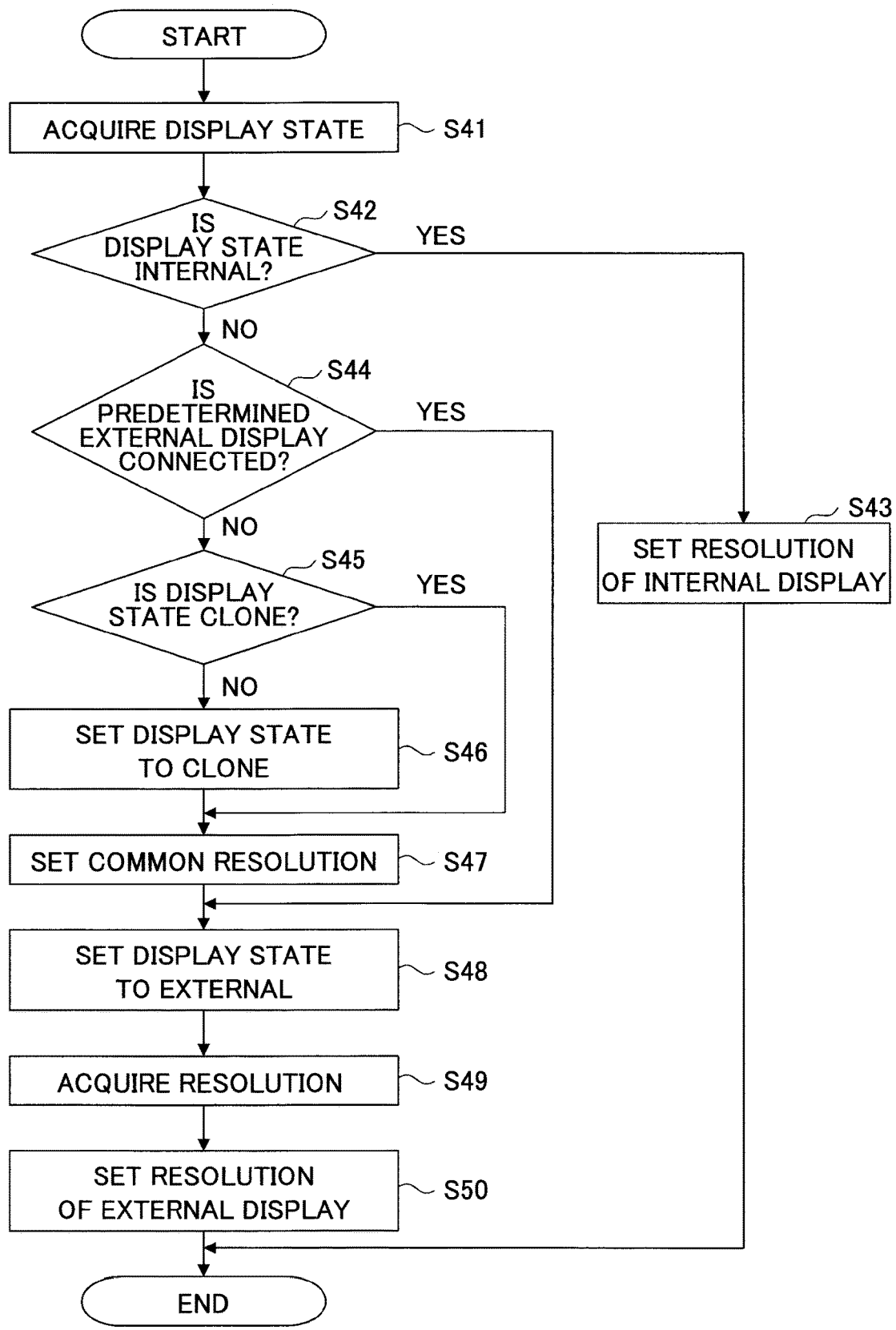

[Fig. 11]
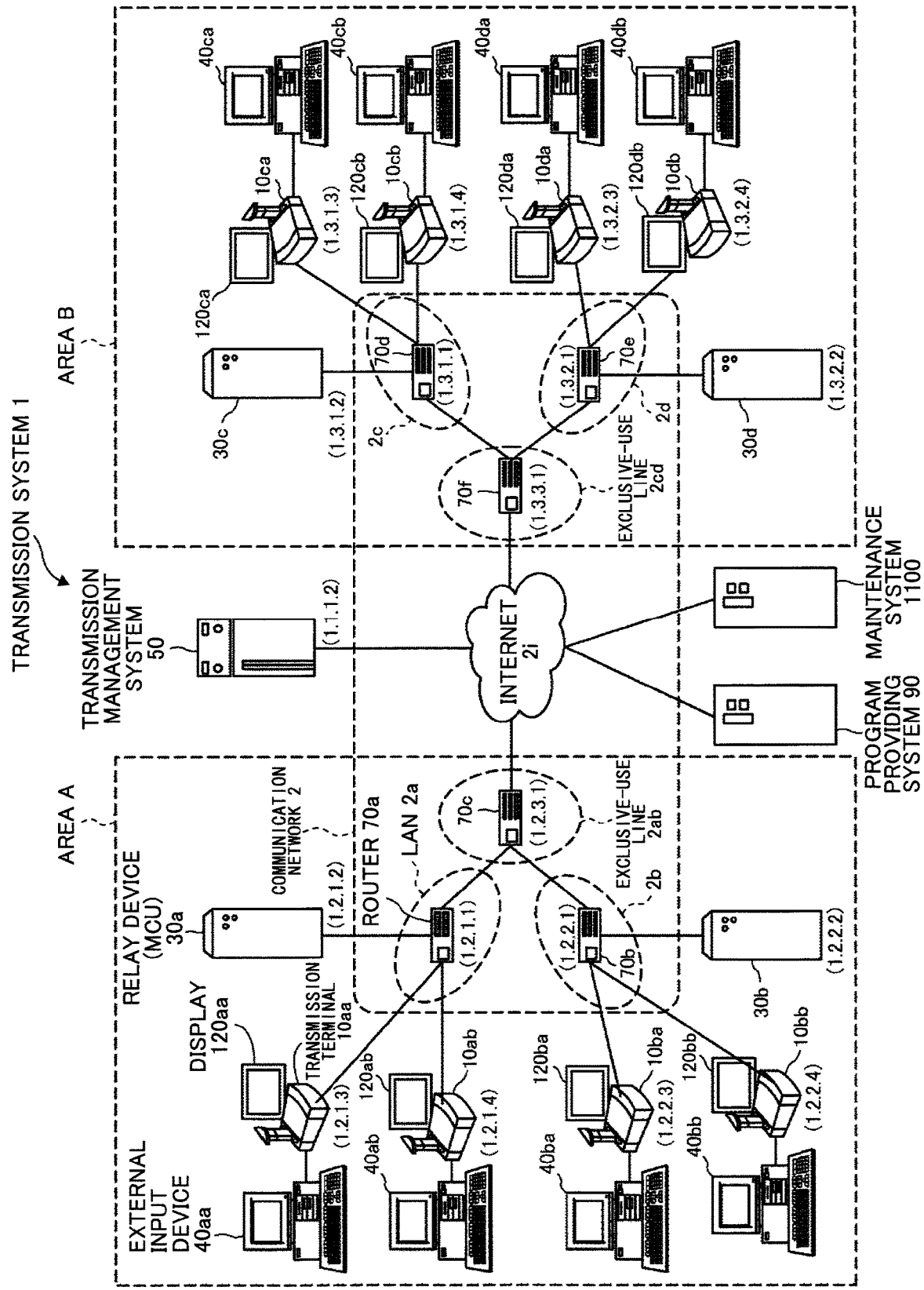

[Fig. 12]
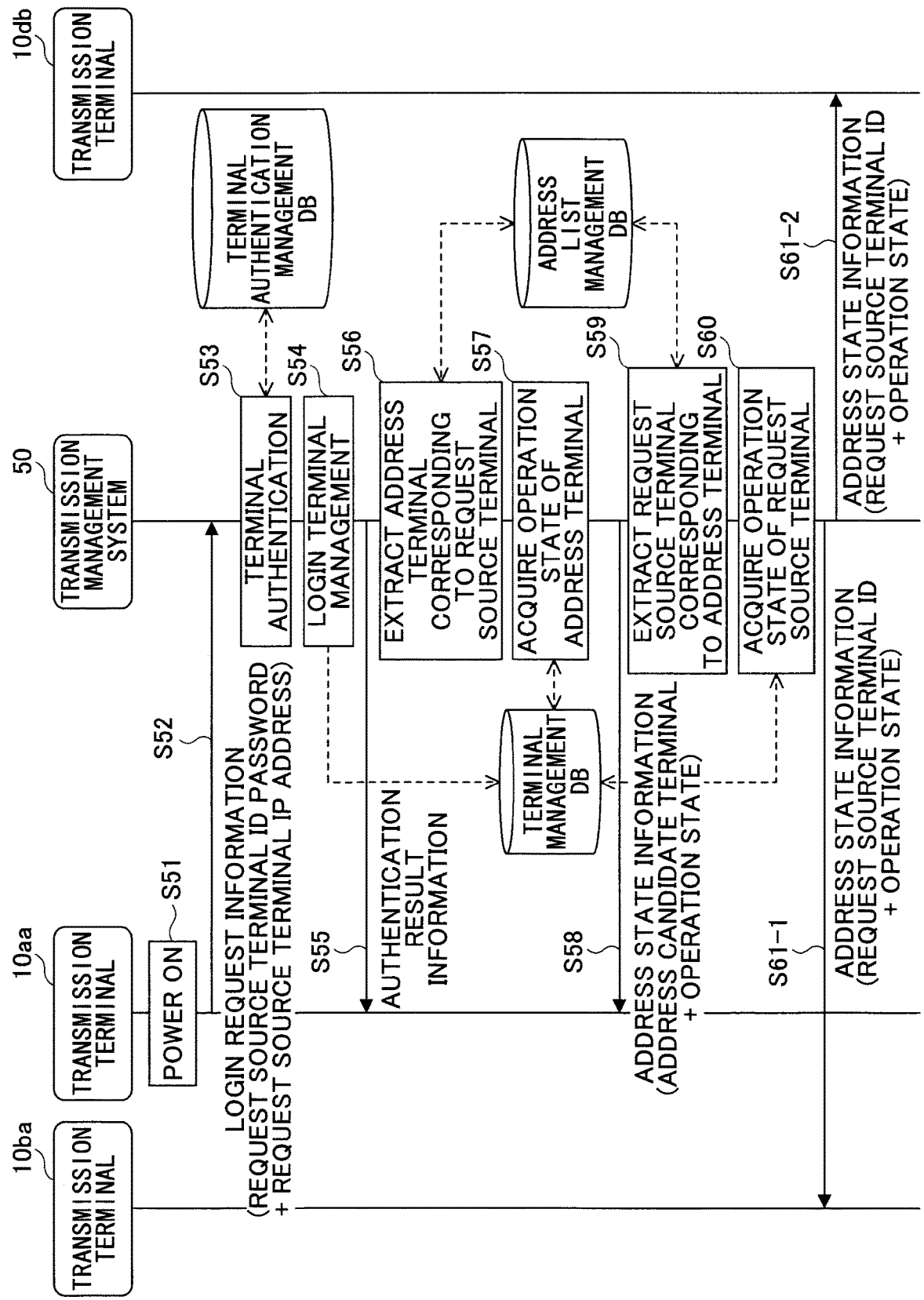

[Fig. 13]
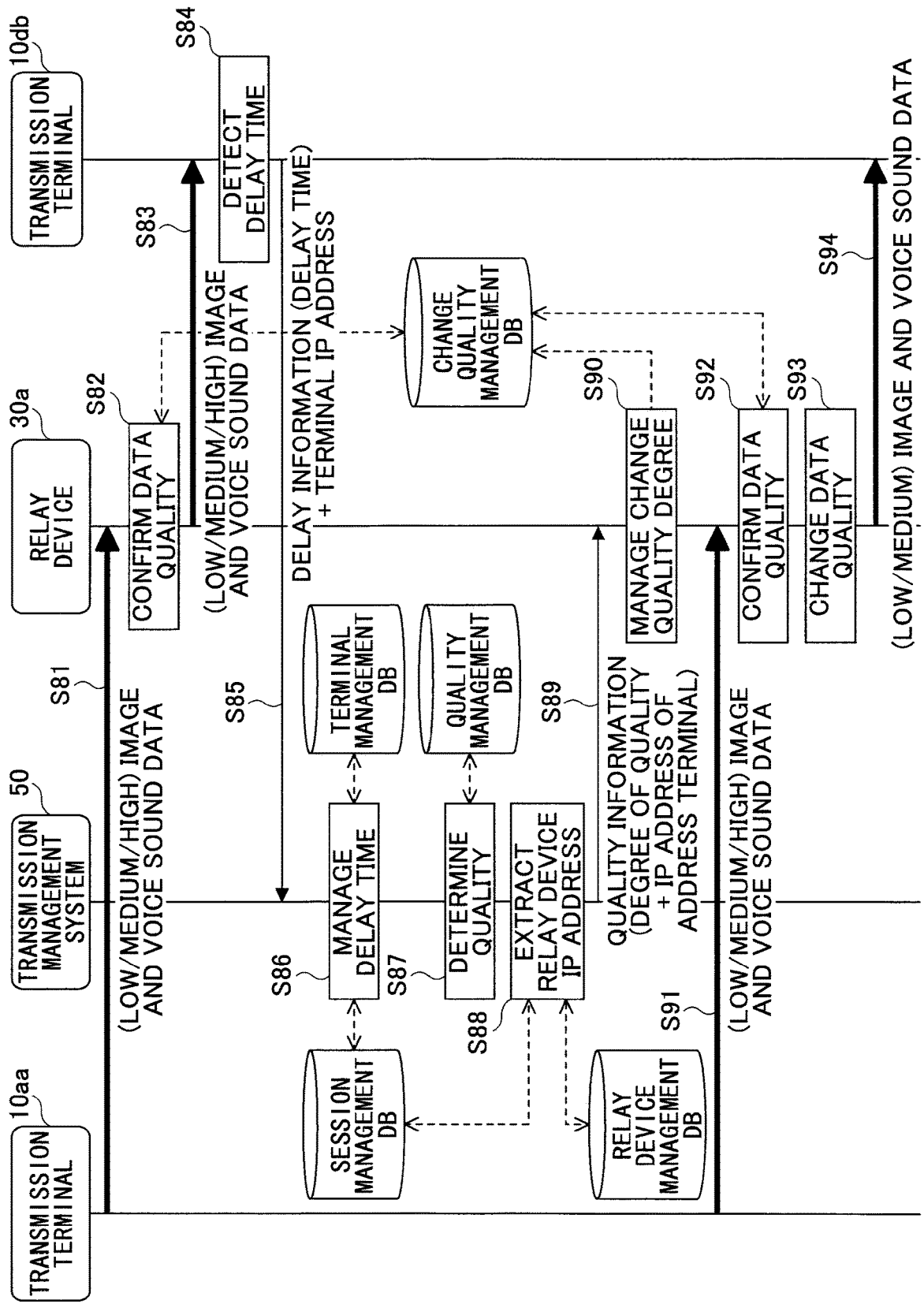

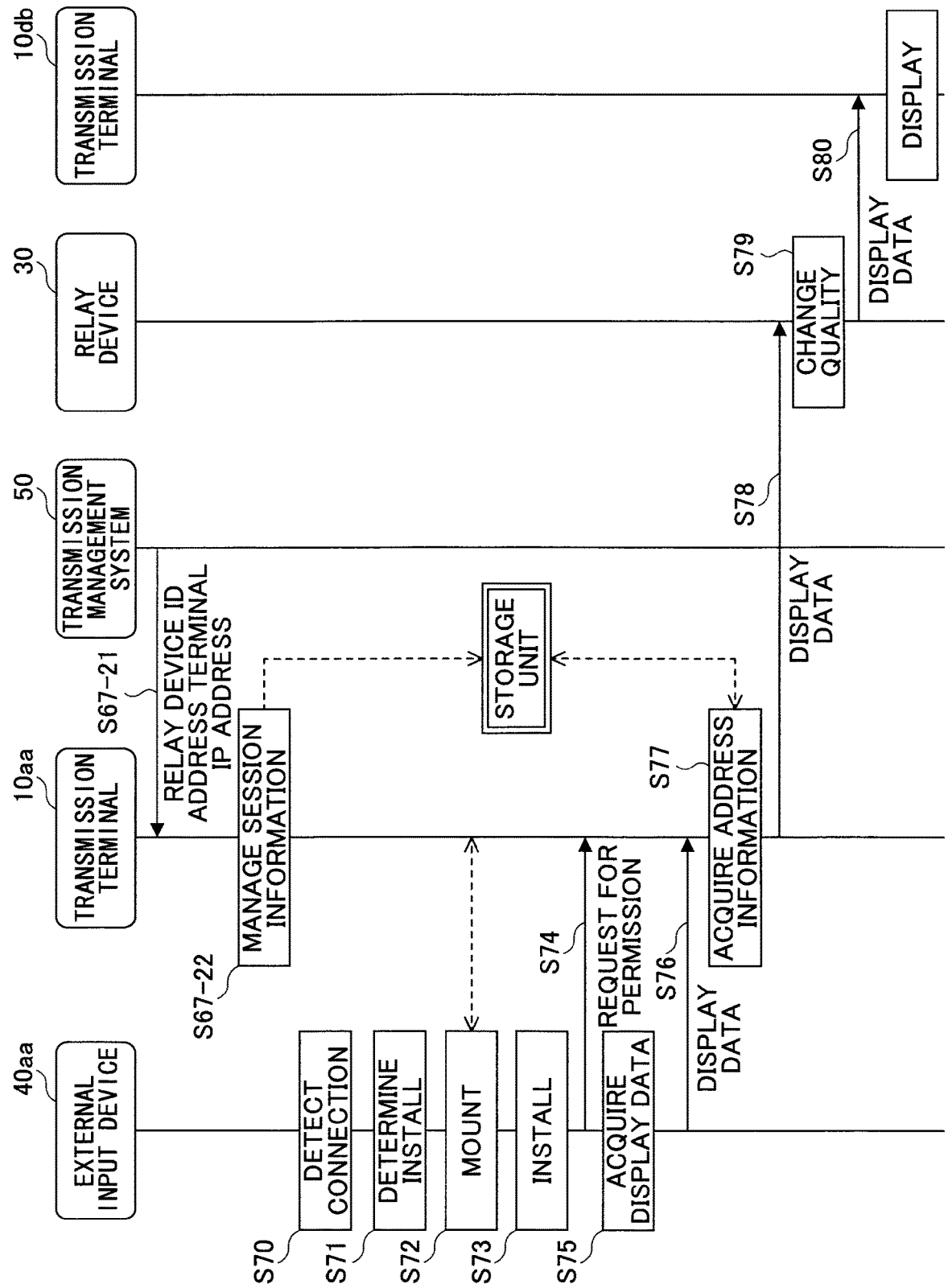
[Fig. 14]

[Fig. 15]
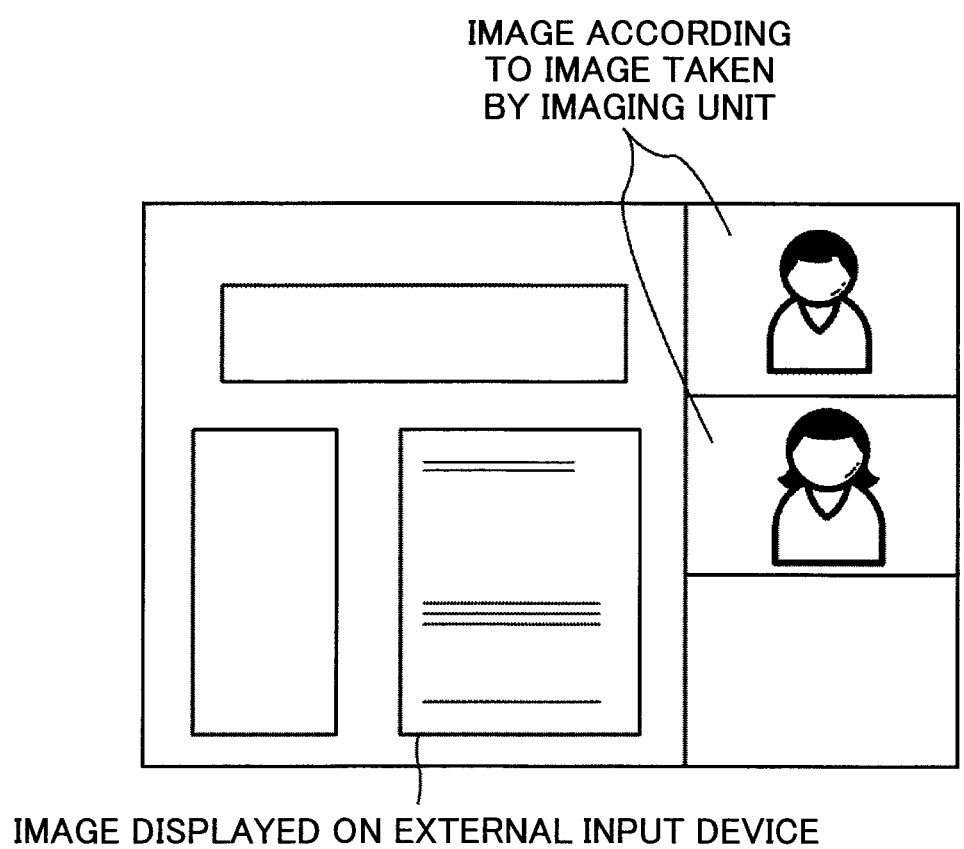

INFORMATION PROCESSING METHOD AND INFORMATION PROCESSING APPARATUS

TECHNICAL FIELD

The present invention relates to an information processing method and an information processing apparatus.

BACKGROUND ART

Conventionally, there is known a conference system using an information processing apparatus having a built-in display device. In such a conference system, there are cases where the information processing apparatus uses a display device connected externally (hereinafter, "external display"), which is different from the display device that is built in the information processing apparatus (hereinafter, "internal display"). In this case, the information processing apparatus switches the display device and uses the display device after switching. Cases where the display devices are switched are as follows. For example, there is a case where an external display having a different display device from that of the internal display, is connected to the information processing apparatus, and a case where an external display having a different resolution from that of the internal display is connected to the information processing apparatus.

With respect to a transmission terminal that is connected to a display device and that outputs image data, there is known a technology of appropriately displaying image data and auxiliary information according to the capability of the display (see, for example, Patent Literature 1).

In the conventional technology, there are cases where after switching from the internal display to the external display, the displayed image becomes smaller than the display area of the external display. This often occurs when the information processing apparatus specifies a resolution that is lower than the resolution of the external display, and the image is displayed on the external display according to the low resolution, and scaling (enlargement) display is not performed. When the image is displayed in the display area of the external display according to the low resolution, a margin such as a black frame is added on the outside of the original image, and the user may feel like something is wrong with the display.

For example, in a regular PC (Personal Computer), when the image displayed after switching from the internal display to the external display, is smaller than the display area of the external display, the user can address this situation by activating a tool for controlling the graphic driver, and making a setting to perform scaling display.

However, in a special purpose information processing apparatus such as a TV conference device or a small-sized terminal, it is not assumed that a tool for controlling the graphic driver will be used, and a graphic driver that is set in advance to perform scaling display is generally incorporated. In this case, at the time of shipping the information processing apparatus, the manufacturer of the graphic driver can incorporate a graphic driver ensuring that scaling display can be performed on the resolution supported by an internal display built in the special purpose information processing apparatus.

However, an external display is often prepared by the user, and there are various types of resolutions supported by the external display, compared to that of a built-in display. Therefore, when a resolution that is not supported by the internal display is directly specified, it may not be possible for the process of switching the display to the external display, the process of changing the resolution, and scaling process to be executed all at once in time. That is, even when a graphic driver that is set in advance to perform scaling display is incorporated in the information processing apparatus, the scaling process may be unsuccessful.

CITATION LIST

Patent Literature

PTL 1: Japanese Laid-Open Patent Application No. 2012-237964

SUMMARY OF INVENTION

The present invention provides an information processing method and an information processing apparatus, in which one or more of the above-described disadvantages are eliminated.

An aspect of the present invention provides a non-transitory computer-readable recording medium storing an information processing program that causes a computer that constitutes an information processing apparatus including a built-in first display device, to execute a process, the process including detecting, from outside the information processing apparatus, a state where a second display device is connected, the second display device being different from the first display device; setting both the first display device and the second display device as display destinations, when switching the display destination from the first display device to the second display device; switching the display destination to the second display device after setting both the first display device and the second display device as display destinations; and controlling a display image according to a screen specification of the second display device.

An aspect of the present invention provides an information processing apparatus including a built-in first display device, the information processing apparatus including a detecting unit configured to detect, from outside the information processing apparatus, a state where a second display device is connected, the second display device being different from the first display device; and a display control unit configured to set both the first display device and the second display device as display destinations, when switching the display destination from the first display device to the second display device, switch the display destination to the second display device after setting both the first display device and the second display device as display destinations, and control a display image according to a screen specification of the second display device.

An aspect of the present invention provides an information processing method executed by an information processing apparatus including a built-in first display device, the information processing method including detecting, from outside the information processing apparatus, a state where a second display device is connected, the second display device being different from the first display device; setting both the first display device and the second display device as display destinations, when switching the display destination from the first display device to the second display device; switching the display destination to the second display device after setting both the first display device and the second display device as display destinations; and controlling a display image according to a screen specification of the second display device.

BRIEF DESCRIPTION OF DRAWINGS

FIG. 1 illustrates a configuration example of an information processing system according to an embodiment.

FIG. 2 illustrates an example of a hardware configuration of an information processing apparatus according to an embodiment.

FIG. 3A illustrates an example of handling the display screens of different display areas according to an embodiment.

FIG. 3B illustrates an example of handling the display screens of different display areas according to an embodiment.

FIG. 3C illustrates an example of handling the display screens of different display areas according to an embodiment.

FIG. 4 illustrates a configuration example of a display control function according to an embodiment.

FIG. 5 is a sequence diagram of an example of processing procedures at the time of display control according to an embodiment (part 1).

FIG. 6 is a sequence diagram of an example of processing procedures at the time of display control according to an embodiment (part 2).

FIG. 7 is a flowchart of an example of processing procedures after detecting the state change according to an embodiment.

FIG. 8A is a flowchart of an example of processing procedures when switching the display destination according to an embodiment.

FIG. 8B is a flowchart of an example of processing procedures when switching the display destination according to an embodiment.

FIG. 9 illustrates an example of an external display resolution correspondence table.

FIG. 10 is a flowchart of an example of processing procedures after detecting the state change according to a modified example.

FIG. 11 is a schematic diagram of a transmission system according to an application example.

FIG. 12 is a sequence diagram of a process of a preparation stage of starting communication between transmission terminals.

FIG. 13 is a sequence diagram of a process of transmitting and receiving image data and voice sound data between transmission terminals.

FIG. 14 is a sequence diagram of a process of displaying display data displayed by an external input device, on a transmission terminal that is the counterpart of the conference.

FIG. 15 illustrates an example of a screen for displaying image data and display data by the transmission terminal.

DESCRIPTION OF EMBODIMENTS

Embodiments of the present invention are described below with reference to the accompanying drawings. The embodiments described below are merely examples; the embodiments to which the present invention is applied are not limited to the following. Note that in all drawings for describing the embodiments, the elements having the same function are denoted by the same reference numerals, and redundant descriptions are omitted.

EXAMPLES

<System Configuration>

FIG. 1 illustrates a configuration example of an information processing system 1000 according to the present embodiment. FIG. 1 illustrates an example of a conference system using a plurality of information processing apparatuses $100a_1$, $100a_2$, $100b_1$, $100b_2$. The information processing apparatuses $100a_1$, $100a_2$ are connected to an internal network Na, and the information processing apparatuses $100b_1$, $100b_2$ are connected to an internal network Nb. Note that the networks Na, Nb (hereinafter, "network N" when collectively referred to) correspond to, for example, a LAN (Local Area Network). Furthermore, the network N is connected to an external network I. Note that the external network I corresponds to, for example, a WAN (Wide Area Network), the Internet, etc. Thus, in the information processing system 1000 according to the present embodiment, the information processing apparatuses $100a_1$, $100a_2$ and the information processing apparatuses $100b_1$, $100b_2$ are able to perform data communication with each other via the external network I. Note that in the information processing system 1000 according to the present embodiment, a program providing device 300 is connected to the external network I. The program providing device 300 provides programs to the information processing apparatuses $100a_1$, $100a_2$, $100b_1$, $100b_2$, for example, via the external network I.

As illustrated in FIG. 1, the information processing apparatuses $100a_1$, $100a_2$, $100b_1$, $100b_2$ according to the present embodiment include internal displays $119a_1$, $119a_2$, $119b_1$, $119b_2$, respectively. Note that in the following, the information processing apparatuses $100a_1$, $100a_2$, $100b_1$, $100b_2$ are referred to as an "information processing apparatus 100" when collectively referred to. Furthermore, in the following, the internal displays $119a_1$, $119a_2$, $119b_1$, $119b_2$ are referred to as an "internal display 119" when collectively referred to.

Furthermore, the information processing apparatuses $100a_1$, $100b_1$ further respectively include external displays 200a, 200b, which have different screen specifications (for example, the "size of the display area", the "resolution", etc.) from those of the internal displays $119a_1$, $119b_1$. Note that in the following, the external displays 200a, 200b are referred to as an "external display 200" when collectively referred to.

The information processing apparatus 100 according to the present embodiment is a device including a display control function, and performs display control of switching the display destination between the internal display 119 and the external display 200. The information processing apparatus 100 corresponds to, for example, a PC (Personal Computer), a terminal exclusively used for conferences, a smartphone, a tablet terminal, a mobile phone, a projector, an interactive whiteboard, a digital signage panel, etc. The internal display 119 and the external display 200 are display devices, and display various images such as video images and still images. Note that in the case of a projector, a projection surface such as a screen on which a projection image is displayed, corresponds to the internal display 119.

The information processing system 1000 according to the present embodiment can provide the following conference services by the above system configuration. For example, the information processing system 1000 makes a connection request (conference participation request) from the information processing apparatus $100a_1$ connected to the network Na to the information processing apparatus $100a_2$ connected to the same network Na. Furthermore, the information processing system 1000 makes a connection request (conference participation request) from the information processing apparatus 100a₁ connected to the network Na to the information processing apparatuses 100b₁, 100b₂ connected to the network Nb, via the external network I. When the information processing apparatuses 100a₂, 100b₁, 100b₂ respond to the connection request (communication participation report), bidirectional data communication is established among the information processing apparatuses 100a₁, 100a₂, 100b₁, 100b₂.

By the above call control, in the information processing system 1000, for example, conference services start to be provided by bidirectional communication, by using various contents such as text, images (including still images and video images), and voice sound. At this time, on the internal display 119 provided in the information processing apparatus 100, for example, image contents such as the video of the conference participants and conference materials are displayed. Furthermore, at this time, when the external display 200 is connected to the information processing apparatus 100, the display destination is switched from the internal display 119 to the external display 200, and the image contents are displayed.

Note that the above method of call control includes, for example, (1) SIP (Session Initiation Protocol) and (2) H.323. Furthermore, the above method of call control includes, for example, (3) a protocol obtained by extending SIP, and (4) a protocol of an instant messenger. Furthermore, the above method of call control includes, for example, (5) a protocol of using the MESSAGE method of SIP, and (6) a protocol of Internet relay chat (IRC). Furthermore, the above method of call control includes, for example, (7) a protocol obtained by extending a protocol of an instant messenger. Among these, (4) a protocol of an instant messenger is a protocol used in, for example, (4-1) XMPP (Extensible Messaging and Presence Protocol) and (4-2) ICQ (registered trademark). Furthermore, (4) a protocol of an instant messenger is a protocol used in, for example, AIM (registered trademark) and Skype (registered trademark). Furthermore, (7) a protocol obtained by extending a protocol of an instant messenger is, for example, Jingle.

Furthermore, as the encoding method of images, for example, H.264/AVC and H.264/SVC may be used; however, other encoding methods may be used.

Furthermore, the call control between information processing apparatuses 100 may be executed, for example, via a call control server. Furthermore, the data communication between the information processing apparatuses 100 may be executed via a relay device for relaying various contents.

<Hardware Configuration>

FIG. 2 illustrates an example of a hardware configuration of the information processing apparatus 100 according to the present embodiment. As illustrated in FIG. 2, the information processing apparatus 100 according to the present embodiment includes a CPU (Central Processing Unit) 101, etc. Furthermore, the information processing apparatus 100 includes a ROM (Read Only Memory) 102 and a RAM (Random Access Memory) 103, etc. Furthermore, the information processing apparatus 100 includes a flash memory 104, a SSD (Solid State Drive) 105, a media drive 107, etc. Furthermore, the information processing apparatus 100 includes an operation button 108, a power source switch 109, an internal power source 110, an external power source IF 111, etc.

Furthermore, the information processing apparatus 100 includes a communication IF 112, a camera 113, an imaging element IF 114, a microphone 115, a speaker 116, a voice sound input output IF 117, etc. Furthermore, the information processing apparatus 100 includes an external display IF 118, an internal display 119, an internal display IF 120, an external device IF 121, etc. In the information processing apparatus 100, the above elements are connected to each other via a bus B.

The CPU 101 is a processor for controlling the entire apparatus 100. The ROM 102 is a non-volatile semiconductor memory that can store internal data even after the power is turned off. The ROM 102 stores, for example, programs executed when the information processing apparatus 100 is activated, and data. The RAM 103 is a volatile semiconductor memory. The CPU 101 is a processor for controlling the entire apparatus 100 and for realizing the installed functions by loading, for example, programs and data from the ROM 102 to the RAM 103, and executing processes.

The flash memory 104 is a non-volatile semiconductor memory such as a flash EEPROM (Electrically Erasable Programmable ROM) or a flash ROM. The SSD 105 performs reading and writing of data in the flash memory 104. The media drive 107 performs reading and writing of data in a storage medium 106. Note that the storage medium 106 is, for example, a flexible disk, a CD (Compact Disk), a DVD (Digital Versatile Disk), and a memory card.

The operation button 108 is a UI (User Interface) used for inputting operation signals in the apparatus. The power source switch 109 turns on or off the power supply to the apparatus. The internal power source 110 is the power source for supplying driving power from the inside and not the outside of the apparatus 100. Note that the internal power source 110 is, for example, a storage cell such as a battery. The external power source IF 111 is an interface between the power source, which is for supplying driver power from outside the apparatus 100, and the information processing apparatus 100. Note that, for example, when the external power source IF 111 is an external power source from a socket, a plug corresponds to the external power source IF 111.

The communication IF 112 is an interface for connecting the apparatus to a predetermined data transmission line such as the network N. The camera 113 includes, for example, an optical system engine such as a lens, and captures an image by receiving incident light by an imaging element, etc. The imaging element IF 114 is an interface for performing data transmission and reception between various optical system devices such as the camera 113, and the information processing apparatus 100. The microphone 115 detects sound by, for example, a sensor. The speaker 116 outputs sound by, for example, replaying data of detected sound and predetermined voice sound contents. The voice sound input output IF 117 is an interface for performing data transmission and reception between various voice sound input output devices such as the microphone 115 and the speaker 116, and the information processing apparatus 100.

The external display IF 118 and the internal display IF 120 are interfaces for performing data transmission and reception between the external display 200 and the internal display 119, and the information processing apparatus 100. The external display 200 and the internal display 119 are, for example, liquid crystal displays, and display process results by the information processing apparatus 100. The external device IF 121 is an interface for performing data transmission and reception between various external devices and the information processing apparatus 100. Here, examples of various external devices are a PC, a smartphone, a tablet terminal, and a mobile phone. Note that to the external device IF 121, an external storage device can be connected, such as a HDD (Hard Disk Drive) and a micro drive.

As described above, by the above configuration, the information processing system 1000 according to the present embodiment is able to provide conference services by bidirectional communication using various contents between remote sites (for example, "between different network areas).

<Display Control Function>

A description is given of a display control function according to the present embodiment. In the information processing apparatus 100 according to the present embodiment, a logical display state is defined in advance, and the information processing apparatus 100 performs display control based on the logical display state. The information processing apparatus 100 uses API (Application Programming Interface) of basic software such as an operating system (OS), to perform display control based on the logical display state.

In the information processing apparatus 100 according to the present embodiment, three types of logical display states are defined, i.e., "INTERNAL", "CLONE", and "EXTERNAL". These three types are examples; there may be four or more types. "INTERNAL" is a state of displaying only on the internal display 119, that is, a state in which an image is about to be displayed only the internal display 119 or a state in which an image is displayed only on the internal display 119. Furthermore, "CLONE" is a state of displaying on both the internal display 119 and the external display 200, that is, a state in which an image is about to be displayed on both the internal display 119 and the external display 200, or a state in which an image is displayed both the internal display 119 and the external display 200. "EXTERNAL" is a state of displaying only on the external display 200, that is, a state in which an image is about to be displayed only the external display 200 or a state in which an image is displayed only on the external display 200.

The information processing apparatus 100 switches the display destination between the internal display 119 (first display device) and the external display 200 (second display device) based on the display state. When switching the display destination when the display state is "EXTERNAL", the information processing apparatus 100 sets the display state to "CLONE", and sets a resolution by which display is commonly possible in both the internal display 119 and the external display 200 (hereinafter, "common resolution"). This common resolution may be set in advance, or resolutions by which images can be displayed on both the internal display 119 and the external display 200 may be acquired, and the a common resolution may set. Accordingly, an image is displayed by the common resolution on both the internal display 119 and the external display 200. After an image is displayed by the common resolution on both the internal display 119 and the external display 200, the information processing apparatus 100 sets the display state to "EXTERNAL", acquires the EDID (Extended display identification data), and sets the resolution of the external display 200 based on the acquired EDID.

Here, when the external display 200 is connected to the information processing apparatus 100 by a graphic driver, the EDID of the external display 200 is stored in a predetermined storage area such as the registry of the OS, for each individual identification information item assigned according to the product information such as the type of the external display. Therefore, the EDID stored in the predetermined storage area may be acquired, instead of from the external display 200.

By setting the state to "CLONE", displaying an image by the common resolution on both the internal display 119 and the external display 200, and then setting the state to "EXTERNAL", it is possible to prevent a situation where the process of switching the display to the external display 200, the process of changing the resolution, and scaling process cannot be executed all at once in time, and the scaling process becomes unsuccessful. The information processing apparatus 100 according to the present embodiment includes such a display control function.

In the conventional technology, it has not been possible to flexibly switch the display destination between different display devices. Here, there are the following cases of switching the display destination. For example, there is a case where an external display 200 having a different display area and resolution from those of the internal display 119, is connected to the information processing apparatus 100. In this case, when the display destination is switched from the internal display 119 to the external display 200, the graphic driver needs to simultaneously perform the processes of turning off the light of the internal display 119 and displaying an image on the external display 200, and the scaling display in the internal display 119 may not be performed in time. That is, the information processing apparatus 100 has to perform the processes of changing the size of the display image and the resolution according to the screen specification of the display corresponding to the display destination.

FIGS. 3A through 3C illustrate examples of handling the display screens of different display areas according to the present embodiment. FIG. 3A illustrates an example where the internal display 119 and the external display 200 have different display. FIGS. 3B and 3C illustrate examples of handling the display screen when switching the display destination between the internal display 119 and the external display 200.

FIG. 3B illustrates a case of handling the display screen when the display has been switched from the external display 200 having a larger display area than the internal display 119, to the internal display 119. In order to display an appropriate image for the display destination, the display image displayed on the external display 200 before the switching needs to be reduced and the magnification ratio needs to be changed such that the image becomes an appropriate size with respect to the display area, according to the screen specification of the internal display 119.

Meanwhile, FIG. 3C illustrates a case of handling the display screen when the display has been switched from the internal display 119 having a smaller display area than the external display 200, to the external display 200. In order to display an appropriate image for the display destination, the display image displayed on the internal display 119 before the switching needs to be enlarged, and the magnification ratio needs to be changed such that the image becomes an appropriate size with respect to the display area, according to the screen specification of the external display 200.

In the conventional technology, it has not been possible to handle the switching of the display destination as described above, and the therefore the image is not appropriately displayed on the display screen after the switching, and the viewability is degraded. As an example phenomenon in which an image is not appropriately displayed on the display screen, there is a phenomenon in which the image does not fit in the display area (the image sticks out from the display area) because the display areas do not match. There is another phenomenon in which the image is smaller than the display area (a margin is created in the display area and the image is displayed in a disproportionate manner). Furthermore, as a phenomenon in which an image is not appropriately displayed on the display screen, for example, there is a phenomenon in which the image quality of the display image is degraded, becomes the resolutions do not match.

Furthermore, when a conference service as described with reference to FIG. 1 is implemented, the following points need to be addressed. In order to clarify the points to be addressed, first, a specific usage scene of the conference service is described. For example, in a conference service, during the conference, the same image is displayed on the information processing apparatus 100 at the own position and on the information processing apparatus 100 at the counterpart's position. At this time, for example, the information processing apparatus 100 at the own position sends image data of the conference material stored in itself, to the information processing apparatus 100 at the counterpart's position. As a result, the same image is displayed on both the information processing apparatus 100 at the own position and on the information processing apparatus 100 at the counterpart's position.

Accordingly, it is possible to view the image of the same conference material at the own position and the counterpart's position, and smooth communication can be performed. Note that the own position corresponds to the conference venue where oneself is located, and the counterpart's position corresponds to the conference venue where another conference participant is located, which means that the conference venue where oneself is located and the conference venue where the other conference participant is located are different locations.

In such a usage scene, image data is usually generated according to a predetermined format (for example, including "sizes" and "resolution") common to the information processing apparatus 100 of the own position and the information processing apparatus 100 of the counterpart's position. Therefore the information processing apparatus 100 of the own position sends the image data to the information processing apparatus 100 of the counterpart's position, and meanwhile, when the same image is displayed on the information processing apparatus 100 of the own position, the same image data as the transmission data needs to be magnified to an appropriate size according to the display screen of the own position. In the usage scene of the conference service, there is demand to address such a point in order to provide an environment for performing smooth communication.

Thus, the display control function according to the present embodiment has a mechanism in which the display screen is controlled according to the screen specification of the display destination after the switching, based on the display state of the internal display 119 and the external display 200.

Accordingly, the display control function according to the present embodiment provides an environment that can handle the switching of the display destination between different display devices. As a result, the display control function according to the present embodiment can improve the viewability of the display screen.

In the following, a description is given of the configuration of the display control function and the operation of the display control function according to the present embodiment. FIG. 4 illustrates a configuration example of a display control function according to the present embodiment. As illustrated in FIG. 4, the display control function according to the present embodiment includes a display control unit 11, a magnification unit 12, a detection unit 21, an information acquisition unit 22, and a setting unit 23. Note that in the present embodiment, the functions of the display control unit 11 and the magnification unit 12 are realized by, for example, application software such as a program installed in the information processing apparatus 100. Furthermore, in the present embodiment, for example, the functions of the detection unit 21, the information acquisition unit 22, and the setting unit 23 are realized by basic software such as an OS installed in the information processing apparatus 100. That is, the display control function according to the present embodiment is realized by the cooperation between basic software and application software operated on the basic software.

The display control unit 11 controls the display screen according to a screen specification of a display corresponding to the display destination, based on the state change of the information processing apparatus 100 detected by the detection unit 21. When the display control unit 11 receives an event report of the detection result from the detection unit 21, the display control unit 11 requests the information acquisition unit 22 to make a query about the device state of the external display 200, and receives a response relevant to the device state (receives the state information of the external display 200). The detection unit 21 reports the event of the detection result to the display control unit 11, when the information processing apparatus 100 is activated.

Furthermore, the display control unit 11 sends a query about the device state of the internal display 119 to the internal display 119, and receives a response relevant to the device state (receives state information of the internal display 119). The display control unit 11 reports the state information of the internal display 119 and the external display 200 to the setting unit 23, and based on the display state that is set by the setting unit 23 based on reported the state information, the display control unit 11 implements control of switching the display destination between the internal display 119 and the external display 200.

The setting unit 23 sets the display state based on the state information of the internal display 119 and the external display 200 reported by the display control unit 11.

The display control unit 11 sends a query about the present display state to the setting unit 23, and performs the following process based on the response to the query. The display control unit 11 sets the resolution of the internal display 119, when the display state is "INTERNAL". Accordingly, an image is displayed on the internal display 119.

Furthermore, when the display state is "EXTERNAL", the display control unit 11 sets "CLONE" as the display state with respect to the setting unit 23, and sets a common resolution with respect to the internal display 119 and the external display 200. After setting the common resolution, the display control unit 11 sets "EXTERNAL" as the display state with respect to the setting unit 23, and also instructs to set the resolution included in the device performance of the external display 200. The setting unit 23 sets the resolution in the external display 200 according to the instruction of the resolution. Furthermore, the display control unit 11 instructs the magnification unit 12 to magnify the display image according to the screen specification of the external display 200.

Furthermore, when the display state is "CLONE", the display control unit 11 sets a common resolution with respect to the internal display 119 and the external display 200. After setting the common resolution, the display control unit 11 sets "EXTERNAL" as the display state with respect to the setting unit 23, and also instructs to set the resolution included in the device performance of the external display 200. The setting unit 23 sets the resolution in the external display 200, according to the instruction of the resolution. Furthermore, the display control unit 11 instructs the magnification unit 12 to magnify the display image according to the screen specification of the external display 200.

The display control unit 11 is able to instruct the internal display 119 to turn off the light, for example, via the API for display drive control provided in the basic software (by calling the API function). Furthermore, the display control unit 11 reports that it is necessary to magnify the display image to the magnification unit 12, for example, by reporting an event or a registry. The method of reporting an event or a registry includes, for example, a method of assigning a magnification report to a predetermined keyboard event, or a method of setting a value indicating a magnification report to a predetermined registry value. The display control unit 11 is able to make a magnification report to the magnification unit 12 by the above methods, for example, via an event included in the basic software or an API for registry reporting. Note that when the external display 200 is not in a state where display is possible, the display control unit 11 may turn the light on for the internal display 119, and may not make the magnification report to the magnification unit 12.

Furthermore, the display control unit 11 may request to make a query about the device performance of the external display 200, to the information acquisition unit 22, when the external display 200 is in a state where display is possible, and receive a response relevant to the device performance (receive performance information of the external display 200). The display control unit 11 instructs the setting unit 23 to set a resolution according to the screen specification of the external display 200, based on the received device performance response. The display control unit 11 passes the value of the resolution included in the received device performance response, and instructs to set the resolution. Note that the display control unit 11 may instruct to set a resolution according to the screen specification of the internal display 119, when the external display 200 is not in a state where display is possible.

The magnification unit 12 magnifies the display image according to the screen specification of the display corresponding to the display destination. The magnification unit 12 first identifies a display area before switching (vertical: H1, horizontal: W1) and a display area after switching (vertical: H2, horizontal: W2), based on a standard of the display areas of various displays set in advance. Accordingly, the magnification unit 12 obtains the magnification ratio (enlargement ratio or reduction ratio) of the display area, based on the ratio of the sizes of the identified display areas (vertical ratio H2/H1, horizontal ratio W2/W1).

Furthermore, the magnification unit 12 may store the magnification ratios of display images obtained in advance for each of the switching patterns of the assumed display destinations, based on the respective screen specifications of the internal display 119 provided in the information processing apparatus 100 and the external display 200 that can be connected to the information processing apparatus 100. For example, when the magnification ratio of the external display 200 is '1', the magnification ratio corresponding to the internal display 119 having a smaller display area than the external display 200 is set as '0.85', and the values of the respective magnification ratios '1' and '0.85' may be stored. As described above, when the respective magnification ratios are stored, the magnification unit 12 identifies the switching pattern of the display destinations (either one of switching from the internal display 119 to the external display 200 or switching from the external display 200 to the internal display 119). As a result, the magnification unit 12 acquires the magnification ratio corresponding to the switching pattern of the display destinations, from a plurality of stored magnification ratios, based on the identification result. Accordingly, the magnification unit 12 is able to magnify the display image, even when it is not possible for the display control unit 11 to acquire device information including the screen specification from the external display 200 via the information acquisition unit 22.

Next, the magnification unit 12 magnifies the display image before switching, based on the obtained magnification ratio or the acquired magnification ratio. At this time, the magnification unit 12 realizes the magnification by generating display data in a predetermined data format that is processable by a UI function (display screen drawing function) of the display corresponding to the display destination. The magnification unit 12 generates display data for magnifying the display image, according to a data format that is processable by a UI function of the display destination. Here, an example of the language of the data format is HTML (HyperText Markup Language)/CSS (Cascading Style Sheets). The magnification unit 12 embeds the image data (display image data) of the display image according to the language specification of the data format, and generates display data in which the value of the magnification ratio is set as the parameter value of the image magnification process. When the language of the data format is HTML, an example of the method of embedding the image data is a method of embedding the image data by using a definition tag such as an image tag. For example, an example of the method of setting a parameter value of the image magnification process, is a method of setting the value of the magnification ratio of the enlargement ratio or the reduction ratio in the attribute value such as transform:scale( ). As a result, on the side of the display corresponding to the display destination, the display data is processed by an installed UI function, and the processed display data is drawn in the display screen based on the process result. Accordingly, on the display screen, the display image itself is displayed in an enlarged size or displayed in a reduced size according to the set magnification ratio.

Note that the above display image includes image data generated at the information processing apparatus 100 and image data stored in advance. Furthermore, the above display image includes image data received from another information processing apparatus 100 via the communication IF 112 and image data received from an external device connected via the external device IF 121.

Furthermore, in a usage scene of a conference service, first, the information processing apparatus 100 of the own position generates image data of the display image according to a predetermined format. Next, the information processing apparatus 100 of the own position functions as a sending unit and sends the generated image data to the information processing apparatus 100 at a counterpart's position. At this time, after the image data is sent or before the image data is sent, the magnification unit 12 included in the information processing apparatus 100 of the own position executes a magnification process when displaying the same image in the information processing apparatus 100 of the own position. At this time, the magnification unit 12 magnifies the display image having the same contents as the image data to be sent, and changes the size (image size).

As described above, in the present embodiment, a UI function common to the internal display 119 and the external display 200 is used to magnify the display image, and therefore there is no need to separately handle the internal display 119 and the external display 200 (to generate display data). That is, in the present embodiment, display data common to the internal display 119 and the external display 200 is used to magnify the display image, and therefore the magnification process can be simplified and the processing load can be reduced.

The detection unit 21 detects the state change of the information processing apparatus 100 when being activated or after being activated. The detected state change includes the state change of connection or non-connection of the external display 200. Specifically, the detected state change includes a state change when the external display 200 is connected to the information processing apparatus 100, and a state change when the information processing apparatus 100 is removed from the information processing apparatus 100 (connection is released). The detection unit 21 detects the state change of the information processing apparatus 100 based on, for example, signals input via the external display IF 118 (input signals from the external display 200), and reports the detection result to the display control unit 11 by an event report. At this time, examples of the method of reporting an event are a method of realizing the event report by using an event function included in the basic software, and a method of realizing the event report by uniquely defining an event and using an extended event function.

Note that the following are specific examples of the scene where a state change occurs at the time of activation or after activation assumed in the present embodiment. Examples are when the information processing apparatus 100 is activated in a state where the external display 200 is connected, and when the information processing apparatus 100 is activated in a state where the external display 200 is not connected. Furthermore, examples are when the external display 200 is connected after the information processing apparatus 100 is activated, and when the external display 200 is removed after the information processing apparatus 100 is activated.

The information acquisition unit 22 acquires various kinds of information from the external display 200 in response to a request from the display control unit 11. The information acquisition unit 22 sends a query about the device state to the external display 200 via the external display IF 118, and acquires state information expressing a state such as display is possible or display is not possible. Furthermore, the information acquisition unit 22 acquires performance information including the resolution, by sending a query about the device performance to the external display 200 via the external display IF 118. The performance information acquired at this time includes, for example, general-purpose data expressing the hardware performance stored in advance by the display device for connecting with various devices. The information acquisition unit 22 transfers the acquired information to the display control unit 11 that is the request source.

Here, a brief description is given of the above general-purpose data that is an example of performance information acquired by the information acquisition unit 22. The display realizes plug and play (automatic detection and automatic connection) with the connected device. Generally, in order to connect a PC and a display, the image signals output by the PC need to be within a range of a frequency and resolution that can be handled by the display. The frequency includes horizontal and vertical scanning frequencies and a clock frequency of the video signals. The resolution means the hardware performance of the dot configuration in the horizontal and vertical directions. In order realize plug and play, the PC needs to acquire these information items from the display by some sort of means. Accordingly, as the general-purpose data that makes it possible to connect various devices, EDID is prepared. EDID is binary data having 128 bytes describing properties unique to the display such as the corresponding frequency, resolution, manufacturer name (vendor ID), and type (product ID), and is stored in a storage device provided in the display. Note that EDID can include an extended block exceeding 128 bytes, according to the properties of the display.

The setting unit 23 sets the display state based on state information of the internal display 119 and the external display 200 reported from the display control unit 11, and sets the resolution of the display corresponding to the display destination in response to a request from the display control unit 11. At this time, the setting unit 23 sets the resolution of the external display 200, based on the value of the resolution received from the display control unit 11. Meanwhile, the setting unit 23 may set the resolution of the internal display 119, based on the value of a resolution stored in advance.

As described above, the display control function according to the present embodiment is realized by implementing software. Specifically, in the information processing apparatus 100, an information processing program realizing the display control function is executed, and the above function units operate in cooperation with each other to realize display control function.

The information processing program is provided by being stored in a file having an installable format or an executable format, in a readable storage medium 106 readable by the information processing apparatus 100 (computer) that is the execution environment. The information processing program has a module configuration including the above function units, and as the CPU 101 reads the programs from the storage medium 106 and executes the programs, the function units are generated in the RAM 103. Note that the method of providing an information processing program is not so limited. For example, the information processing program may be stored in a device connected to the Internet, and the information processing program may be downloaded via a network N via the communication IF 112. Specifically, in the information processing system 1000 according to the present embodiment, as the information processing apparatus 100 sends a request for an information processing program to the program providing device 300, the program is downloaded from the program providing device 300 and installed.

Furthermore, even after installing the information processing program, when the program is updated, the program is downloaded by the following method. For example, as the program providing device 300 reports the update to the information processing apparatus 100, the updated program is downloaded from the program providing device 300 and installed. When there is an update, the program itself may be downloaded, or a difference in the elements constituting the program such as a library may be downloaded. Furthermore, the method of providing an information processing program may be performed by incorporating the program in the ROM 102 or the flash memory 104 in advance.

In the following, a description is given of a process performed when executing an information processing program (cooperation operation by respective function units) according to the present embodiment, with reference to a sequence diagram and a flowchart.

<<Process when External Display 200 is Connected>>

FIG. 5 is a sequence diagram of an example of processing procedures at the time of display control according to the present embodiment (part 1). The information processing apparatus 100 according to the present embodiment executes the following processes by the respective function units, when the external display 200 is connected.

As illustrated in FIG. 5, when the detection unit 21 detects the state change of the information processing apparatus 100 (step S101), the detection unit 21 reports the detection result as an event report to the display control unit 11 (step S102).

Upon receiving this, the display control unit 11 requests the information acquisition unit 22 to make a query about the device state of the external display 200 (step S103). The information acquisition unit 22 sends a query about the device state to the external display 200 via the external display IF 118 (step S104), and receives a device state report from the external display 200 (step S105). Accordingly, the information acquisition unit 22 acquires the state information indicating the connection state of the external display 200. The information acquisition unit 22 sends a response including the device state of the external display 200 to the display control unit 11 that is the request source, based on the acquired state information (step S106).

Upon receiving this, the display control unit 11 switches the display destination between the internal display 119 and the external display 200, based on the device state response.

Specifically, the display control unit 11 reports, to the setting unit 23, the device state information acquired from the internal display 119, together with the received device state response of the external display 200, and implements control of switching the display destination between the internal display 119 and the external display 200, based on the display state set by the setting unit 23 based on the state information. When the display state is "EXTERNAL", the display control unit 11 sets the display state as "CLONE" with respect to the setting unit 23, and sets the common resolution with respect to the internal display 119 and the external display 200. After setting the common resolution, the display control unit 11 sets the display state as "EXTERNAL" with respect to the setting unit 23, so that the external display 200 is in a state where display is possible. In this case, the display control unit 11 instructs the internal display 119 to turn off the light of the display screen (step S107). Next, the display control unit 11 instructs the magnification unit 12 to magnify the display image according to the screen specification of the external display 200, by an event or a registry report (step S108).

Upon receiving this, the magnification unit 12 generates display data for magnifying the display image displayed on the internal display 119, based on the magnification ratio obtained from the vertical ratio and the horizontal ratio of the display area of the internal display 119 and the display area of the external display 200 (step S109). At this time, the magnification unit 12 embeds the image data of the display image according to the language specification processable by the UI function of the external display 200, and generates display data in which the value of the magnification ratio is set as the parameter value of the image magnification process.

Furthermore, when the display state is "EXTERNAL", the display control unit 11 requests the information acquisition unit 22 to make a query about the device performance of the external display 200 (step S110). The information acquisition unit 22 sends a query about the device performance to the external display 200 via the external display IF 118 (step S111), and receives a device performance report from the external display 200 (step S112). Accordingly, the information acquisition unit 22 acquires the performance information from the external display 200. The information acquisition unit 22 sends a response including the device performance of the external display 200, to the display control unit 11 that is the request source, based on the acquired performance information (step S113).

Upon receiving this, the display control unit 11 instructs the setting unit 23 to set the resolution according to the screen specification of the external display 200, based on the value of the resolution included in the device performance response (step S114). The setting unit 23 sets the resolution of the external display 200, based on the value of the resolution received from the display control unit 11 (step S115).

As a result, at the external display 200 to which the display destination has been switched, the display data is interpreted by the UI function, and the magnified display image is drawn on the display screen.

As described above, in the display control function according to the present embodiment, the image displayed on the internal display 119 before switching, is magnified to a size appropriate for the display area of the external display 200 after switching, and is displayed according to an appropriate resolution.

<<Process when External Display 200 is not Connected>>

FIG. 6 is a sequence diagram of an example of processing procedures at the time of display control according to the present embodiment (part 2). The information processing apparatus 100 according to the present embodiment executes the following processes by the respective function units, when the external display 200 is removed.

As illustrated in FIG. 6, when the detection unit 21 detects the state change of the information processing apparatus 100 (step S201), the detection unit 21 reports the detection result as an event report to the display control unit 11 (step S202).

Upon receiving this, the display control unit 11 requests the information acquisition unit 22 to make a query about the device state of the external display 200 (step S203). The information acquisition unit 22 receives device state report indicating that the external display 200 has been removed (non-connected state) from the external display IF 118. Accordingly, the information acquisition unit 22 acquires state information indicating the non-connection state of the external display 200. The information acquisition unit 22 sends a response including the device state of the external display 200, to the display control unit 11 that is the request source, based on the acquired state information (step S204).

Upon receiving this, the display control unit 11 switches the display destination between the internal display 119 and the external display 200, based on the device state response.

Specifically, the display control unit 11 determines that the external display 200 is in a state where display is not possible from the received device state response, and instructs the internal display 119 to turn off the light of the display screen (step S205). Next, the display control unit 11 instructs the magnification unit 12 to magnify the display image according to the screen specification of the internal display 119, by an event or a registry report (step S206).

Upon receiving this, the magnification unit 12 generates display data for magnifying the display image displayed on the external display 200, based on the magnification ratio obtained from the vertical ratio and the horizontal ratio of the display area of the internal display 119 and the display area of the external display 200 (step S207). At this time, the magnification unit 12 embeds the image data of the display image according to the language specification processable by the UI function of the internal display 119, and generates display data in which the value of the magnification ratio is set as the parameter value of the image magnification process.

Furthermore, when the display control unit 11 determines that the external display 200 is in a state where display is not possible, the display control unit 11 instructs the setting unit 23 to set a resolution according to the screen specification of the internal display 119 (step S208). The setting unit 23 sets the resolution of the internal display 119 based on a value of a resolution stored in advance (step S209).

As a result, at the internal display 119 to which the display destination has been switched, the display data is interpreted by the UI function, and the magnified display image is drawn on the display screen.

As described above, in the display control function according to the present embodiment, the image displayed on the external display 200 before switching, is magnified to a size appropriate for the display area of the internal display 119 after switching, and is displayed according to an appropriate resolution.

<<Detailed Process of Display Control>>

FIG. 7 is a flowchart of an example of processing procedures after detecting the state change according to the present embodiment. FIG. 7 illustrates an example of detailed processes by the information processing apparatus 100 for setting the resolution executed after setting the display state, based on the state information of the internal display 119 and the external display 200.

As illustrated in FIG. 7, the information processing apparatus 100 acquires, by the display control unit 11, the display state from the setting unit 23 (step S11). The display control unit 11 can acquire the display state from the setting unit 23, when the information processing apparatus 100 is activated.

The information processing apparatus 100 determines, by the display control unit 11, whether the display state set by the setting unit 23 is "INTERNAL" (step S12).

When the information processing apparatus 100 determines that the display state is "INTERNAL" (step S12: YES), the information processing apparatus 100 sets, by the setting unit 23, the resolution of the internal display 119, based on the value of the resolution stored in advance (step S13).

When the information processing apparatus 100 determines that the display state is not "INTERNAL" (step S12: NO), the information processing apparatus 100 determines, by the display control unit 11, whether the display state set by the setting unit 23 is "CLONE" (step S14).

When the information processing apparatus 100 determines that the display state is not "CLONE" (step S14: NO), the information processing apparatus 100 sets, by the display control unit 11, the display state as "CLONE" in the setting unit 23 (step S15).

In step S14, when the information processing apparatus 100 determines that the display state is "CLONE" (step S14: YES), and after the information processing apparatus 100 sets the display state as "CLONE" in step S15, the display control unit 11 instructs the setting unit 23 to set a common resolution. Accordingly, the setting unit 23 sets a common resolution in the internal display 119 and the external display 200 (step S16).

The information processing apparatus 100 sets, by the display control unit 11, the display state as "EXTERNAL" in the setting unit 23 (step S17).

The information processing apparatus 100 acquires, by the information acquisition unit 22, EDID corresponding to the performance information, from the external display 200 (step S18). Next, the information processing apparatus 100 sets, by the setting unit 23, the resolution of the external display 200, based on the value of the resolution included in the acquired EDID (step S19).

FIGS. 8A and 8B are flowcharts of an example of processing procedures when switching the display destination according to the present embodiment. FIG. 8A illustrates an example of a detailed process of display control executed when the external display 200 is connected to the information processing apparatus 100. Meanwhile, FIG. 8B illustrates an example of a detailed process of display control executed when the external display 200 is removed from the information processing apparatus 100. Note that the processes illustrated in FIGS. 8A and 8B are examples of a case in which the display area of the external display 200 is larger than that of the internal display 119.

As illustrated in FIG. 8A, when the information processing apparatus 100 detects, by the detection unit 21, the connection of the external display 200 (step S21), the information processing apparatus 100 switches the display destination by the display control unit 11 (step S22). At this time the display control unit 11 switches the display destination from the internal display 119 to the external display 200.

The information processing apparatus 100 enlarges, by the magnification unit 12, the display image according to the display area of the external display 200 (step S23). At this time, the magnification unit 12 embeds the image data of the display image according to a language specification processable by the UI function of the external display 200, and generates display data in which the value of the enlargement ratio is set as a parameter value of the image magnification process. Next, the information processing apparatus 100 sets, by the setting unit 23, the resolution according to the device performance of the external display 200 (step S24). At this time, the setting unit 23 sets the resolution based on a value of the resolution included in the EDID of the external display 200.

As a result, the external display 200 draws the image enlarged to a size appropriate for the display area in the display screen, and displays the image according to the appropriate resolution (step S25).

As illustrated in FIG. 8B, when the information processing apparatus 100 detects, by the detection unit 21, the removal of the external display 200 (step S31), the information processing apparatus 100 switches the display destination by the display control unit 11 (step S32). At this time, the display control unit 11 switches the display destination from the external display 200 to the internal display 119.

The information processing apparatus 100 reduces, by the magnification unit 12, the display image according to the display area of the internal display 119 (step S33). At this time, the magnification unit 12 embeds the image data of the display image according to the language specification processable by the UI function of the internal display 119, and generates display data in which the value of the reduction ratio is set as the parameter value of the image magnification process. Next, the information processing apparatus 100 sets, by the setting unit 23, the resolution according to the device performance of the internal display 119 (step S34). At this time, the setting unit 23 sets the resolution based on a value of the resolution included in the internal display 119 stored in advance.

As a result, the internal display 119 draws the image reduced to a size appropriate for the display area in the display screen, and displays the image according to the appropriate resolution (step S35).

<Overview>

As described above, the information processing apparatus 100 according to the present embodiment switches the display destination between the internal display 119 and the external display 200, based on the display state of the internal display 119 and the external display 200, and controls the display screen according to the screen specification of the display corresponding to the display destination after switching. At this time, the information processing apparatus 100 magnifies the display image and sets the resolution of the display. When the display state is a state of displaying only on the external display 200, the display state is set to display on both the internal display 119 and the external display 200, and a common resolution is set in the internal display 119 and the external display 200. After setting the common resolution, the display control unit 11 sets the display state to the state of displaying only on the external display 200 with respect to the setting unit 23, and sets the resolution in the external display 200. Accordingly, it is possible to reduce unsuccessful scaling processes.

That is, the information processing apparatus 100 according to the present embodiment provides an environment in which it is possible to control the display screen according to the screen specification of the display destination, when switching the display destination between different display devices. Furthermore, according to specified resolution, it is possible to perform scaling display on an external display. As a result, the information processing apparatus 100 according to the present embodiment can improve the viewability of the display screen.

Modified Example

As the configuration of the information processing system 1000 according to the present modified example, FIG. 1 can be applied. As the hardware configuration of the information processing apparatus 100 according to the present modified example, FIG. 2 can be applied. As the configuration example of the display control function according to the present modified example, FIG. 4 can be applied.

The information processing system 1000 according to the present modified example reduces disturbances and flickers in the display, when displaying on both the internal display 119 and the external display 200. Depending on the external display 200, there are cases where defects such as disturbances and flickers occur in the display, when the external display 200 is connected to the information processing apparatus 100 and the display state is set as "CLONE". This defect is presumed to occur when setting the device performance such as the resolution acquired from the external display 200.

Specifically, when the EDID of the external display 200 is stored in a predetermined storage area such as the registry of the OS, the information of the external display 200 other than the EDID is also stored in the predetermined storage area. This information of the external display 200 includes the default resolution information. Immediately after the external display 200 is connected to the information processing apparatus 100, the information processing apparatus 100 refers to the default resolution, and changes the resolution of the external display 200. For example, as the default resolution, when 1920 pixels in the width and 1080 pixels in the height (1920×1080) are stored in a predetermined storage area, immediately after the external display 200 is connected to the information processing apparatus 100, a graphic driver reads the setting stored in the predetermined storage area, and sets the resolution of 1920×1080 in the external display 200. As a result, the image is displayed on the external display 200 by a resolution of 1920×1080. That is, before an instruction to set the resolution is given by the display control unit 11, the display control unit 11 displays images on the external display 200 by the default resolution. When an instruction to set the resolution is given, and the display control unit 11 sets a resolution in both the internal display 119 and the external display 200, there are cases where defects such as disturbances and flickers in the display occur. These disturbances and flickers in the display will make the user feel like something is wrong with the display.

Therefore, in the present embodiment, the resolution (for example, 1280×800) to be set with respect to the external display 200 in which a defect occurs, is stored in advance in a predetermined storage area. Therefore, it is possible to omit the process of setting the resolution in the predetermined storage area, and therefore flickers can be mitigated. Furthermore, the default resolution is set in the external display 200, and therefore there is substantially no change in the resolution, in other words, there is no change in the display timing, and therefore the defect can be definitely mitigated.

Specifically, an external display resolution correspondence table associating an external display in which a defect occurs, with the device performance such as the resolution set when connecting the external display, is stored in advance. When the external display 200 is connected, and the external display 200 is included in the external display resolution correspondence table, the information processing apparatus 100 does not set the common resolution but sets the display state to "EXTERNAL", acquires the resolution from the external display resolution correspondence table, and sets the resolution of the external display 200 based on the acquired resolution.

<External Display Resolution Correspondence Table>

FIG. 9 illustrates an example of an external display resolution correspondence table. In FIG. 9, a resolution is associated with a combination of the type that is acquired when the external display 200 is connected to the information processing apparatus 100, and the type of port to which the interface connected to the external display 200 is applied such as VGA (Video Graphics Array), HDMI (registered trademark) (High-Definition Multimedia Interface), DVI (Digital Visual Interface), etc.

<<Process when External Display 200 is Connected>>

As the example of processing procedures at the time of display control according to the present modified example (part 1), FIG. 5 can be applied. However, when the display control unit 11 switches the display destination between the internal display 119 and the external display 200 based on the device state information, the display control unit 11 performs the following process. The display control unit 11 reports, to the setting unit 23, the device state information acquired from the internal display 119, together with the received device state information of the external display 200, and based on the display state that is set by the setting unit 23 based on the reported state information, the display control unit 11 implements control of switching the display destination between the internal display 119 and the external display 200.

When the display state is not "INTERNAL", the display control unit 11 determines whether the type acquired from the external display 200 is included in the external display resolution correspondence table. When the type acquired from the external display 200 is not included in the external display resolution correspondence table, and the display state is "EXTERNAL", the display control unit 11 sets "CLONE" as the display state with respect to the setting unit 23, and sets a common resolution with respect to the internal display 119 and the external display 200. After setting the common resolution, the display control unit 11 sets "EXTERNAL" as the display state with respect to the setting unit 23, and instructs to set the resolution included in the device performance of the external display 200. The setting unit 23 sets the resolution in the external display 200.

When the type acquired from the external display 200 is included in the external display resolution correspondence table, the display control unit 11 sets "EXTERNAL" as the display state with respect to the setting unit 23, refers to the external display resolution correspondence table, and sets, in the external display 200, the resolution associated with the combination of the type acquired from the external display 200 and the type of port to which the external display 200 is connected. The setting unit 23 sets the resolution in the external display 200.

<<Process when External Display 200 is not Connected>>

As the example of processing procedures at the time of display control according to the present modified example (part 2), FIG. 6 can be applied.

<<Detailed Process of Display Control>>

FIG. 10 is a flowchart of an example of processing procedures after detecting the state change according to the present modified example. FIG. 10 illustrates an example of detailed processes by the information processing apparatus 100 for setting the resolution executed after setting the display state, based on the state information of the internal display 119 and the external display 200.

As steps S41 through S43, steps S11 through S13 of FIG. 7 can be applied.

When the information processing apparatus 100 determines that the display state is not "INTERNAL" (step S42: NO), the display control unit 11 determines whether a predetermined external display has been connected, by determining whether the type acquired from the external display 200 is included in the external display resolution correspondence table (step S44).

When the type acquired from the external display 200 is not included in the external display resolution correspondence table (step S44: NO), the information processing apparatus 100 determines, by the display control unit 11, whether the display state set by the setting unit 23 is "CLONE" (step S45).

When the type acquired from the external display 200 is included in the external display resolution correspondence table (step S44: YES), the process transits to step S48.

As the processes of steps S45 through S50, steps S14 through S19 of FIG. 7 can be applied. However, in step S49, the display control unit 11 refers to the external display resolution correspondence table, and acquires the resolution associated with the combination of the type acquired from the external display 200 and the type of port to which the external display 200 is connected.

<Overview>

As described above, the information processing apparatus 100 according to the present modified example prepares and stores in advance, an external display resolution correspondence table associating the combination of an external display in which a defect occurs and the type of port to which the external display is connected, with the resolution to be set when the external display is connected. When the external display 200 is connected and the external display 200 is included in the external display resolution correspondence table, the information processing apparatus 100 does not set the common resolution, instead sets "EXTERNAL" as the display state, acquires the resolution from the external display resolution correspondence table, and sets the resolution of the external display 200 based on the acquired resolution. Accordingly, it is possible to reduce the defects such as disturbances and flickers in the display, when displaying on both the internal display 119 and the external display 200.

Accordingly, the information processing apparatus 100 according to the present embodiment can provide an environment in which it is possible to control the display screen according to the screen specification of the display destination, when switching the display destination between different display devices. Furthermore, according to specified resolution, it is possible to perform scaling display on an external display. As a result, the information processing apparatus 100 according to the present embodiment can improve the viewability of the display screen.

Note that in the above embodiment, a description is given of display control by taking as an example the switching of the display destination based on the connection state of the external display 200; however, the present embodiment is not so limited. For example, the display control may be for switching the display destination based on changes in the usage setting of the external display 200. In this case, when the information processing apparatus 100 receives a setting change of invalidating the usage of the external display 200 from an operation event of the user, the information processing apparatus 100 switches the display destination from the external display 200 to the internal display 119. Subsequently, when the information processing apparatus 100 receives a setting change of validating the usage of the external display 200 from an operation event of the user, the information processing apparatus 100 switches the display destination from the internal display 119 to the external display 200.

Furthermore, in the above embodiment, a description is given of the display control target by taking as an example a display device such as a display; however, the present embodiment is not so limited. The display control target may be, for example, a PC, a smartphone, a tablet terminal, and a mobile phone. That is, the display control target may be any device provided with a display device that can be connected to the information processing apparatus 100.

Furthermore, in the above embodiment, for example, a description is given by taking as an example the conference material stored in the information processing apparatus 100 being displayed on the internal display 119 or the external display 200 in a conference service; however, the present embodiment is not so limited. For example, an image may be displayed on the internal display 119 or the external display 200, by connecting an external device to the information processing apparatus 100, and causing the information processing apparatus 100 to receive, from the external device, display data for displaying material data.

Application Example

An application example of the above-described information processing apparatus 100 is described.

FIG. 11 is a schematic diagram of a transmission system 1 according to an application example of the present invention, and the overview of the present application example is described first with reference to FIG. 11. Here, the transmission system 1 includes a data providing system for transmitting content data in one direction from one transmission terminal to another transmission terminal via a transmission management system, and a communication system for mutually transmitting information and feelings among a plurality of the transmission terminals via a transmission management system. This communication system is for mutually transmitting information and feelings among a plurality of communication terminals (corresponding to "transmission terminals") via the communication management system (corresponding to "transmission management system"), and examples are a TV or video conference system, a video telephone system, a voice sound conference system, a voice sound telephone system, and a PC (Personal Computer) screen sharing system.

In the present application example, a description is given of a transmission system, a transmission management system, and a transmission terminal, assuming a TV or video conference system as an example of a communication system, a TV or video conference management system as an example of a communication management system, and a TV or video conference terminal as an example of a communication terminal. That is, the transmission terminal and transmission management system according to the present invention are not only applied to a TV or video conference system but are also applied to a communication system or a transmission system.

The transmission system 1 illustrated in FIG. 11 includes a plurality of transmission terminals (10aa, 10ab, . . . , 10db), displays (120aa, 120ab, . . . , 120db) for the plurality of transmission terminals (10aa, 10ab, . . . , 10db), a plurality of relay devices (30a, 30b, 30c, 30d), a plurality of external input devices (40aa, 40ab, . . . , 40db), a transmission management system 50, a program providing system 90, and a maintenance system 1100.

Note that in the present embodiment, "transmission terminal 10" is used when indicating an arbitrary transmission terminal among the transmission terminals (10aa, 10ab, . . . , 10db), "display 120" is used when indicating an arbitrary display among the displays (120aa, 120ab, . . . , 120db), "relay device 30" is used when indicating an arbitrary relay device among the relay devices (30a, 30b, 30c, 30d), and "external input device 40" is used when indicating an arbitrary external input device among the external input devices (40aa, 40ab, . . . , 40db). Here, as the transmission terminal 10, the information processing apparatus 100 according to the embodiment and modified example described above can be applied, and as the display 120, the external display 200 according to the embodiment and modified example described above can be applied. The transmission terminal 10 has a built-in internal display 119.

The transmission terminal 10 transmits and receives image data, voice sound data, etc., between other transmission terminals 10. In the present modified example, a description is given of a case where the images of the image data are video images; however, the images may not be video images but still images. Furthermore, images the image data may include both video images and still images. The relay device 30 relays the image data and voice sound data among the plurality of transmission terminals 10. The transmission management system 50 manages the transmission terminals 10 and the relay devices 30 in a unified manner.

The external input device 40 is connected to the transmission terminal 10, and sends display data for displaying material data to the transmission terminal 10. Here, the material data is, for example, data used by using document creation software, spreadsheet software, presentation software, etc. Here, as the external input device 40, a personal computer can be applied.

Furthermore, a plurality of routers (70a, 70b, . . . , 70f) illustrated in FIG. 11 select the optimum path for the image data and voice sound data. Note that in the present embodiment, "router 70" is used when indicating an arbitrary router among the routers (70a, 70b, . . . , 70f). The program providing system 90 includes a HD (Hard Disk) (not shown) storing programs for transmission terminals for causing the transmission terminal 10 to realize various functions or various means, and can send programs for the transmission terminals to the transmission terminal 10. Furthermore, the HD of the program providing system 90 also stores programs for the relay device for causing the relay device 30 to realize various functions or various means, and can send programs for the relay device to the relay device 30. Furthermore, the HD of the program providing system 90 also stores programs for transmission management for causing the transmission management system 50 to realize various functions or various means, and can send programs for transmission management to the transmission management system 50.

Furthermore, the transmission terminal 10aa, the transmission terminal 10ab, the relay device 30a, and the router 70a are communicatively connected to each other by a LAN 2a. The transmission terminal 10ba, the transmission terminal 10bb, the relay device 30b, and the router 70b are communicatively connected to each other by a LAN 2b. Furthermore, the LAN 2a and the LAN 2b are communicatively connected to each other by an exclusive-use line 2ab including the router 70c, and is constructed in a predetermined area A. For example, the area A is Japan, the LAN 2a is constructed in a business office in Tokyo, and the LAN 2b is constructed in a business office in Osaka.

Meanwhile, the transmission terminal 10ca, the transmission terminal 10cb, the relay device 30c, and the router 70d are communicatively connected to each other by a LAN 2c. The transmission terminal 10da, the transmission terminal 10db, the relay device 30d, and the router 70e are communicatively connected to each other by a LAN 2d. Furthermore, the LAN 2c and the LAN 2d are communicatively connected to each other by an exclusive-use line 2cd including the router 70f, and is constructed in a predetermined area B. For example, the area B is the U.S.A., the LAN 2c is constructed in a business office in New York, and the LAN 2d is constructed in a business office in Washington D. C. The area A and the area B are communicatively connected to each other via an Internet 2i from the respective routers (70c, 70f).

Furthermore, the transmission management system 50 and the program providing system 90 are communicatively connected to the transmission terminal 10 and the relay device 30, via the Internet 2i. The transmission management system 50 and the program providing system 90 may be installed in the area A or the area B or in an area other than these.

Note that in the present embodiment, a communication network 2 is constructed by the LAN 2a, the LAN 2b, the exclusive-use line 2ab, the Internet 2i, the exclusive-use line 2cd, the LAN 2c, and the LAN 2d.

Furthermore, in FIG. 11, the four numbers indicated below the transmission terminals 10, the relay devices 30, the transmission management system 50, the routers 70, and the program providing system 90, indicate the IP address in a general IPv4 in a simplified manner. For example, the IP address of the transmission terminal 10aa is "1.2.1.3". Furthermore, IPv6 may be used instead of IPv4; however, as a matter of simplifying the description, IPv4 is used.

Next, with reference to FIG. 12, a description is given of a process of a preparation stage before starting communication, between the transmission terminal 10aa and the transmission terminal 10*db*. First, when the user switches on the power source switch 109 illustrated in FIG. 2, the power of the transmission terminal 10*aa* is turned on (step S51). Then, the transmission terminal 10*aa* is triggered by the power on, and automatically sends login request information indicating a login request, to the transmission management system 50 via the communication network 2 (step S52). This login request information includes a terminal ID for identifying the transmission terminal 10*aa* that is the own device as the request source, and a password. The terminal ID and password are data that is read and sent from the flash memory 104 of the transmission terminal 10*aa*. Note that when login request information is sent from the transmission terminal 10*aa* to the transmission management system 50, the transmission management system 50 that is the receiving side can recognize the IP address of the transmission terminal 10*aa* that is the sending side.

Next, the transmission management system 50 performs terminal authentication, by searching a terminal authentication management table of a terminal authentication management DB, by using as the search key the terminal ID and the password included in the received login request information, and determining whether the same terminal ID and password are managed (step S53). In the terminal authentication management table, passwords are managed by being associated with the terminals IDs of all transmission terminals 10 managed by the transmission management system 50. When the transmission management system 50 manages the same terminal ID and password, it is determined that the login request is made from a transmission terminal 10 having an authorized usage right, and the transmission management system 50 stores, in the terminal management table of the terminal management DB, the terminal ID of the transmission terminal 10*aa*, the operation state, the reception time and date when the above login request information has been received, and the IP address of the transmission terminal 10*aa* in association with each other (step S54). In the terminal management table, the operation state of the transmission terminal 10, the reception time and date when the above login request information has been received at the transmission management system 50, and the IP address of the transmission terminal 10 are managed by being associated with the terminal IDs of the respective transmission terminals 10. Accordingly, in the terminal management table, an operation state "online", a reception time and date "2009.11.10.13:40", and a terminal IP address "1.2.1.3", are managed by being associated with the transmission terminal ID "01aa".

Then, the transmission management system 50 sends the authentication result information indicating the authentication result, to the request source terminal 10*aa* that has made the above login request, via the communication network 2 (step S55). In the present application example, the following description is continued for a case where the transmission management system 50 has determined that the terminal has a valid usage right.

The transmission management system 50 searches an address list management table of an address list management DB, by using as the search key the terminal ID "01aa" of the request source terminal 10*aa* that has made the login request, and reads and extracts the terminal ID of a candidate address terminal 10B that can communicate with the request source terminal 10*aa* (step S56). In the address list management table, all of the terminal IDs of address terminals 10B that are registered as candidates of the address terminal 10B are managed by being associated with terminal ID of the request source terminal 10A requesting the start of a TV conference. Here, the terminal IDs "01ab", "01ba", "01db" of the address terminals (10*ab*, 10*ba*, 10*db*) corresponding to the terminal ID "01aa" of the request source terminal 10*aa*, are extracted. Next, the transmission management system 50 searches the terminal management table by using as a search key the extracted terminal IDs ("01ab", "01ba", "01db") of candidates of the address terminal 10B, and acquires the operation states of the transmission terminals (10*ab*, 10*ba*, 10*db*) by reading the operation states ("offline", "online", "online") of the extracted terminal IDs (step S57).

Next, the transmission management system 50 sends, to the request source terminal 10*aa* via the communication network 2, address state information including the terminal IDs ("01ab", "01ba", "01db") that are the search keys used in step S57 and the operation states ("offline", "online", "online") of the corresponding address terminals (10*ab*, 10*ba*, 10*db*) (step S58). Accordingly, the request source terminal 10*aa* is able to recognize the operation states ("offline", "online", "online") at the present time point of the transmission terminals (10*ab*, 10*ba*, 10*db*) that are candidates of the address terminal 10B that can communicate with the request source terminal 10*aa*.

Furthermore, the transmission management system 50 searches the address list management table by using as a search key the terminal ID "01aa" of the request source terminal 10*aa* that has made the login request, and extracts the terminal ID of another request source terminal 10A for which the terminal ID "01aa" of the request source terminal 10*aa* is registered as a candidate of the address terminal 10B (step S59). In the address list management table, the extracted terminal IDs of the other request source terminals 10A are "01ab", "01ba", and "01db".

Next, the transmission management system 50 searches the terminal management table by using as the search key the terminal ID "01aa" of the request source terminal 10*aa* that has made the login request, and acquires the operation state of the request source terminal 10*aa* that has made the login request (step S60).

Then, the transmission management system 50 sends address state information including the terminal ID "01aa" and the operation state "online" of the request source terminal 10*aa* acquired in step S60, to transmission terminals (10*ba*, 10*db*) whose operation state is "online" in the terminal management table, among the transmission terminals (10*ab*, 10*ba*, 10*db*) relevant to the terminal IDs ("01ab", "01ba", "01db") extracted in step S59 (steps S61-1, S61-2). Note that when the transmission management system 50 sends the address state information to the transmission terminals (10*ba*, 10*db*), the transmission management system 50 refers to the IP address of the terminal managed by the terminal management table, based on the terminal IDs ("01ba", "01db"). Accordingly, it is possible send the terminal ID "01aa" of the request source terminal 10*aa* that has made the above login request and the operation state "online", to each of the other address terminals (10*ba*, 10*db*) that can communicate as the request source terminal 10*aa* that has made the above login request being the address.

Meanwhile, in another transmission terminal 10, similar to step S51, when the user switches on the power source switch 109, the other transmission terminal 10 receives power on, and performs the same processes as steps S52 through S61-1, S61-2, and therefore descriptions thereof are omitted.

Next, with reference to FIG. 13, a description is given of a process of sending and receiving image data and voice sound data for holding a TV conference between the request source terminal 10*aa* and the address terminal 10*db*. First, the request source terminal 10*aa* sends, to the relay device 30*a* via the communication network 2, image data obtained by taking an image of a subject, and voice sound data of voice sound input at a voice sound input unit (step S81). Note that in the present embodiment, it is possible to send high-quality image data constituted by three resolutions of low resolution, medium resolution, and high resolution, and voice sound data. Accordingly, the relay device 30*a* receives image data of three resolutions and voice sound data. Then, the relay device 30*a* confirms the quality of the images of the image data to be relayed, by searching a change quality management table in a change quality management DB, by using as a search key the IP address "1.3.2.4" of the address terminal 10*db*, and extracting the image quality of the corresponding image data to be relayed (step S82). In the change quality management table, the IP address of the transmission terminal 10 as the relay destination of image data, and the image quality of the image data to be relayed by the relay device 30 to this relay destination, are managed by being associated with each other. In the present application example, the confirmed image quality of the image of the image data is "high image quality", which is the same as the image quality of the received image data, and the image data and the voice sound data are transferred to the address terminal 10*db* without changing the image quality or the voice sound quality (step S83). Accordingly, the address terminal 10*db* receives the image data and voice sound data, and can display the image based on the image data on the display 120 and output voice sound based on the voice sound data.

Next, the transmission terminal 10*db* detects the delay time of the reception of the received image data at every certain time (for example, every one second) (step S84). Note that in the present modified example, the following description is continued for a case where the delay time is 200 ms.

The address terminal 10*db* sends delay information indicating the delay time "200 ms" to the transmission management system 50 via the communication network 2 (step S85). Accordingly, the transmission management system 50 recognizes the delay time, and can also recognize the IP address "1.3.2.4" of the transmission terminal 10*db* that is the transmission source of the delay information.

Next, the transmission management system 50 extracts a corresponding terminal ID "01db" by searching the terminal management table in the terminal management DB by using as a search key the IP address "1.3.2.4" of the address terminal 10*db*, and further manages and stores the delay time "200 ms" indicated in the delay information, in the field part of the delay time in the record of the terminal ID "01db" in a session management table (step S86). In the session management table in a session management DB, the relay device ID of the relay device 30 to be used for relaying the image data and the voice sound data, the terminal ID of the request source terminal 10A, the terminal ID of the address terminal 10B, the delay time ms of reception when the image data is received at the address terminal 10B, and the reception time and date when the delay information indicating this delay time is sent from the address terminal 10B and received at the transmission management system 50 are managed by being associated with each session ID for selection used for executing a session for selecting a relay device 30.

Next, the transmission management system 50 searches a quality management table in a quality management DB, by using the above delay time "200 ms" as the search key, extracts the image quality "medium image quality" of the corresponding image data, and thus determines the image quality to be "medium image quality" (step S87).

Next, the transmission management system 50 searches a relay device management table in a relay device management DB by using as the search key the relay device ID "111a" associated with the above terminal ID "01db" in the session management table, and extracts the IP address "1.2.1.2" of the corresponding relay device 30*a* (step S88). In the relay device management table, the operation state of each relay device 30, the reception time and date when the state information indicating the operation state is received at the transmission management system 50, the IP address of the relay device 30, and the maximum data transmission speed (Mbps) at the relay device 30 are managed by being associated with each relay device ID of the relay devices 30. Then, the transmission management system 50 sends quality information indicating the image quality "medium image quality" of the image data determined in step S87, to the relay device 30*a* via the communication network 2 (step S89). This quality information includes the IP address "1.3.2.4" of the address terminal 10*db* used as the search key in step S86. Accordingly, in the relay device 30*a*, the transmission terminal 10 that is the transmission destination (here, the address terminal 10*db*) and the image quality "medium image quality" of the image data to be relayed, are managed by being associated with each other in the change quality management table (step S90).

Next, similar to step S81, the transmission terminal 10*aa* sends high-quality image data constituted by three resolutions of low resolution, medium resolution, and high resolution, and voice sound data, to the relay device 30*a* (step S91). Accordingly, similar to step S82, the relay device 30*a* searches the change quality management table by using as a search key the IP address "1.3.2.4" of the address terminal 10*db*, extracts the image quality "medium image quality" of the corresponding image data to be relayed, and thus confirms the quality of the image of the image data to be relayed (step S92). In the present application example, the confirmed image quality of the image data is "medium image quality", which is lower than the image quality of the received image data "high image quality", and therefore the relay device 30*a* changes the quality of the image of the image data by suppressing the image quality of the image data from "high image quality" to "medium image quality" (step S93). Then, the relay device 30*a* sends the image data whose image quality has been changed to "medium image quality", and the voice sound data whose voice sound quality has not been changed, to the transmission terminal 10*db* via the communication network 2 (step S94). As described above, at the address terminal 10*db* receiving the image data, when a delay occurs in the reception, the relay device 30*a* is able to change the quality of the image such that the people participating in the TV conference do not feel like something is wrong.

Next, with reference to FIG. 14, a description is given of a process of sharing the entire screen displaying material data stored in the external input device 40 after the relay device 30 is determined. Here, a description is given of an example in which the information displayed by the external input device 40*aa* connected to the transmission terminal 10*aa* is displayed on the transmission terminal 10*db* that is the address terminal.

As described above, when the relay device 30 is determined, in step S67-21, the transmission terminal 10*aa* receives the relay device ID "111a" and the IP address "1.3.2.4" of the address terminal 10*db* sent by the transmission management system 50, and stores the received relay device ID "111a" and the IP address "1.3.2.4" (step S67-22).

Furthermore, when the external input device 40aa and the transmission terminal 10aa are connected to each other, the external input device 40aa detects the connection (step S70). When the external input device 40aa detects that the external input device 40aa and the transmission terminal 10aa are connected to each other, the external input device 40aa determines whether a program for executing a function of sending display data is already installed (step S71). When it is determined that the program for executing a function of sending display data is not installed in step S71, the external input device 40aa acquires the program for executing a function of sending display data stored in the transmission terminal 10aa, and installs the program (step S72). When the program for executing a function of sending display data is installed in step S72, the external input device 40aa requests the transmission terminal 10aa for permission to execute the process of acquiring display data (step S73). When the transmission terminal 10aa gives the external input device 40aa permission to execute the process of acquiring display data, the external input device 40aa acquires the display data (step S74). Next, the external input device 40aa sends the acquired display data to the transmission terminal 10aa (step S75).

When it is determined that the program for executing a function of sending display data is installed in step S71, the process proceeds to step S73 and onward.

When the transmission terminal 10aa that is the transmission destination receives the display data, the transmission terminal 10aa acquires the stored relay device ID "111a" and the IP address "1.3.2.4" of the transmission terminal 10db to be the address terminal (step S77). Then, the transmission terminal 10aa sends the display data and the IP address "1.3.2.4" of the transmission terminal 10db to be the address terminal, to the relay device 30 indicated by the relay device ID "111a" acquired in step S77 (step S78). When the relay device 30 receives the display data sent from the transmission terminal 10aa in step S78, the relay device 30 changes the quality of the display data based on the IP address "1.3.2.4" of the transmission terminal 10db (step S79), and sends the display data to the transmission terminal 10db (step S80). As the details of the process of step S77, the process of changing the quality of the voice sound data and the image data described above (steps S81 through S94) can be applied. When the transmission terminal 10db receives the display data sent from the relay device 30, the display control unit 11 of the transmission terminal 10db displays the image according to the performance such as the resolution of the internal display 119 and the external display 200. Furthermore, the display control unit 11 is also able to display the display data of the external input device 40. In the example illustrated in FIG. 15, in the left part of the screen, the image displayed on the external input device 40aa is displayed based on display data, and in the top right part of the screen, image data taken and sent by an imaging unit such as the camera 113 of the transmission terminal 10aa is displayed. Furthermore, in the bottom right part of the screen, image data taken by an imaging unit such as the camera 113 of the transmission terminal 10db is displayed.

As described above, in the transmission terminal 10 according to the present embodiment, the display destination is switched between the internal display 119 of the transmission terminal 10 and the external display 200, based on the display state of the internal display 119 and the display 120 to which the external display 200 according to the above embodiment and modified example can be applied, and the display screen is controlled according to the screen specification of the display corresponding to the display destination after switching. At this time, the transmission terminal 10 is able to magnify the display image and set the resolution of the display. When the display state is to only display on the display 120, the display state is set to a state for displaying on both the external display 120 and the internal display 119 of the transmission terminal 10, and a common resolution is set for the external display 120 and the internal display 119 of the transmission terminal 10. After setting the common resolution, the transmission terminal 10 sets the display state for displaying only on the display 120, and sets the resolution in the display 120. Accordingly, it is possible to reduce unsuccessful scaling processes.

According to one embodiment of the present invention, scaling display can be performed in an externally-connected display device, according to a specified resolution.

The information processing method and the information processing apparatus are not limited to the specific embodiments described herein, and variations and modifications may be made without departing from the scope of the present invention.

Although the present invention has been described with reference to specific embodiments, and modified examples, they are merely illustrative, the skilled person may understand various variations, modifications, alternatives, substitutions, and the like. Although the apparatuses according to an embodiment of the present invention are described with reference to functional block diagrams, the apparatuses may be realized by hardware, software, or by a combination thereof. The present invention is not limited to the above embodiments, and various variations, modifications, alternatives, substitutions, and the like are encompassed by the present invention without departing from the spirit of the present invention.

The present application is based on and claims the benefit of priority of Japanese Priority Patent Application No. 2014-180261, filed on Sep. 4, 2014, the entire contents of which are hereby incorporated herein by reference.

The invention claimed is:

1. A non-transitory computer-readable recording medium storing an information processing program that causes a computer that constitutes an information processing apparatus including a built-in first display device, to execute a process, the process comprising:
  detecting, from outside the information processing apparatus, a state where a second display device is connected, the second display device being different from the first display device;
  determining a type of the second display device, and determining whether the type is included in a predetermined list of known display types;
  setting both the first display device and the second display device as display destinations, when switching the display destination from the first display device to the second display device;
  when determining that the type is not included in the predetermined list,
    performing a process of determining a display state;
    determining at least one first resolution that can be displayed on the first display device;
    acquiring, from the second display device, at least one second resolution that can be displayed on the second display device; and
    setting a particular resolution common to the first display device and the second display device based on the determined at least one first resolution and the acquired at least one second resolution, after setting both the first display device and the second display device as the display destinations;

when determining that the type is included in the predetermined list, setting a resolution of the second display device based on the determined type of the second display device:

switching the display destination to the second display device after setting both the first display device and the second display device as display destinations; and controlling a display image according to a screen specification of the second display device.

2. The non-transitory computer-readable recording medium according to claim 1, the process further comprising:

acquiring performance information indicating a performance of the second display device, from the second display device, after switching the display destination to the second display device; and setting a second resolution that is included in the performance information, in the second display device.

3. The non-transitory computer-readable recording medium according to claim 1, the process further comprising:

setting a third resolution in the second display device, the third resolution being stored in a memory included in the information processing apparatus.

4. The non-transitory computer-readable recording medium according to claim 1, the process further comprising:

obtaining a magnification ratio of the display image when switching the display destination, the magnification ratio being obtained based on a ratio of a size of a display area before switching and a size of a display area after switching, and magnifying the display image based on the obtained magnification ratio.

5. The non-transitory computer-readable recording medium of claim 1, wherein the process further includes, when determining that the type is included in the predetermined list, setting the resolution of the second display device based on a combination of the determined type and a type of port to which the second display device is connected.

6. An information processing apparatus including a built-in first display device, the information processing apparatus comprising:

a detector configured to detect, from outside the information processing apparatus, a state where a second display device is connected, the second display device being different from the first display device; and a display control circuit configured to determine a type of the second display device, and determine whether the type is included in a predetermined list of known display types;

set both the first display device and the second display device as display destinations, when switching the display destination from the first display device to the second display device, when determining that the type is not included in the predetermined list, perform a process of determining a display state;

determine at least one first resolution that can be displayed on the first display device;

acquire, from the second display device, at least one second resolution that can be displayed on the second display device; and set a particular resolution common to the first display device and the second display device based on the determined at least one first resolution and the acquired at least one second resolution, after setting both the first display device and the second display device as the display destinations;

when determining that the type is included in the predetermined list, set a resolution of the second display device based on the determined type of the second display device;

switch the display destination to the second display device after setting both the first display device and the second display device as display destinations, and control a display image according to a screen specification of the second display device.

7. An information processing method executed by an information processing apparatus including a built-in first display device, the information processing method comprising:

detecting, from outside the information processing apparatus, a state where a second display device is connected, the second display device being different from the first display device;

determining a type of the second display device, and determining whether the type is included in a predetermined list of known display types;

setting both the first display device and the second display device as display destinations, when switching the display destination from the first display device to the second display device;

when determining that the type is not included in the predetermined list, performing a process of determining a display state;

determining at least one first resolution that can be displayed on the first display device;

acquiring from the second display device, at least one second resolution that can be displayed on the second display device; and setting a particular resolution common to the first display device and the second display device based on the determined at least one first resolution and the acquired at least one second resolution, after setting both the first display device and the second display device as the display destinations;

when determining that the type is included in the predetermined list, setting a resolution of the second display device based on the determined type of the second display device:

switching the display destination to the second display device after setting both the first display device and the second display device as display destinations; and controlling a display image according to a screen specification of the second display device.

8. The method of claim 7, wherein the at least one first resolution and the at least one second resolution both include the particular resolution, but the at least one first resolution is not identical to the at least one second resolution.

* * * * *